United States Patent
Sellers et al.

(10) Patent No.: US 9,397,852 B2
(45) Date of Patent: Jul. 19, 2016

(54) CONNECTED HOME USER INTERFACE SYSTEMS AND METHODS

(75) Inventors: Jayson Sellers, Flower Mound, TX (US); Heath Stallings, Colleyville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 190 days.

(21) Appl. No.: 13/602,062

(22) Filed: Aug. 31, 2012

(65) Prior Publication Data

US 2014/0068486 A1 Mar. 6, 2014

(51) Int. Cl.
*G06F 3/048* (2013.01)
*H04L 12/28* (2006.01)
*G06F 3/0484* (2013.01)

(52) U.S. Cl.
CPC ........ *H04L 12/2818* (2013.01); *G06F 3/04847* (2013.01); *H04L 12/282* (2013.01); *H04L 2012/285* (2013.01)

(58) Field of Classification Search
CPC ................................ H04N 21/43; G06F 3/048
USPC ........................................................ 715/735
See application file for complete search history.

(56) References Cited

U.S. PATENT DOCUMENTS

| | | | | |
|---|---|---|---|---|
| 5,519,878 | A * | 5/1996 | Dolin, Jr. ...................... | 709/220 |
| 2003/0229474 | A1* | 12/2003 | Suzuki et al. ................. | 702/188 |
| 2005/0192778 | A1* | 9/2005 | Suzuki et al. ................. | 702/185 |
| 2006/0283938 | A1* | 12/2006 | Kumar et al. ................. | 235/382 |
| 2007/0043478 | A1* | 2/2007 | Ehlers et al. ................. | 700/276 |
| 2007/0112939 | A1* | 5/2007 | Wilson et al. ................. | 709/219 |
| 2007/0192486 | A1* | 8/2007 | Wilson et al. ................. | 709/225 |
| 2008/0063400 | A1* | 3/2008 | Hudson et al. ................ | 398/106 |
| 2009/0232506 | A1* | 9/2009 | Hudson et al. ................ | 398/106 |
| 2009/0276105 | A1* | 11/2009 | Lacaze et al. ..................... | 701/2 |
| 2011/0071656 | A1* | 3/2011 | McKiel, Jr. ..................... | 700/90 |
| 2012/0044061 | A1* | 2/2012 | Sakai et al. .................. | 340/12.5 |
| 2012/0066632 | A1* | 3/2012 | Sundermeyer et al. ....... | 715/771 |
| 2012/0262628 | A1* | 10/2012 | Wilson et al. ................. | 348/552 |
| 2013/0113822 | A1* | 5/2013 | Putrevu .................... | G09G 5/00 |
| | | | | 345/619 |
| 2014/0020033 | A1* | 1/2014 | Wilson et al. ................... | 725/80 |

\* cited by examiner

*Primary Examiner* — Jennifer To
*Assistant Examiner* — Xuyang Xia

(57) ABSTRACT

An exemplary method includes a user interface subsystem communicatively coupled to a home monitor and control subsystem providing a graphical user interface view for display on a display screen, the graphical user interface view including a graphical representation of a floor plan of a home associated with the home monitor and control subsystem and a graphic representing an element of the home monitor and control subsystem, wherein the graphic is positioned relative to the graphical representation of the floor plan in the graphical user interface view to visually indicate a location of the element at the home.

19 Claims, 16 Drawing Sheets

CONNECTED HOME USER INTERFACE SYSTEMS AND METHODS

BACKGROUND INFORMATION

As computing and communication technologies have advanced, connected home systems have been developed and made commercially available. Such connected home systems allow a person, such as subscriber to a connected home service, to remotely monitor and/or control connected devices located at the person's home. For example, a person may utilize a personal computer, a mobile device (e.g., a smartphone or tablet computer), or other computing device to remotely view surveillance video captured at the person's home, lock or unlock a door lock, turn a light on or off, or otherwise monitor and/or control connected devices at the person's home.

User interfaces have been developed for use by a person to remotely interface with connected home systems. A common challenge for developers of such user interfaces has been to design and implement user interfaces that provide an appropriate balance of information, usability, intuitiveness, control, and functionality that promotes a quality user experience. While technologies for connected home system user interfaces have made advances in this regard, there remains room for improvement. For instance, there remains room to improve the intuitiveness, convenience, functionality, and/or usability of user interfaces designed to be used by a person to remotely monitor and/or control connected devices at the person's home.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary connected home systems and methods are disclosed herein. The exemplary systems and methods described herein may provide one or more user interfaces for use by a user of a computing device to remotely monitor and/or control one or more elements of a home monitor and control subsystem located at a home associated with the user. For example, the exemplary systems and methods described herein may provide a graphical user interface ("GUI") that includes a graphical representation of a floor plan of the home and one or more graphics representing one or more elements of the home monitor and control subsystem displayed relative to the floor plan (e.g., within the context of the floor plan) of the home in the GUI. A graphic representing an element of the home monitor and control subsystem in the GUI may visually indicate a location of the element at the home (e.g., within the context of the floor plan of the home).

In certain examples, a graphic representing an element of the home monitor and control subsystem may provide one or more features and/or functions for use by the user. For example, such a graphic may include a callout window overlaid on the graphical representation of the floor plan of the home in the GUI, include a textual description of the element, indicate a current connection status of the element, indicate a current operational status of the element, include at least one option configured to be selected by the user to control operation of the element, and/or include a user selectable link to additional information for the element (e.g., settings information, historical notification information, and/or previous data recording information for the element).

In certain examples, the GUI may include a floor plan definition tool for use by the user to define the graphical representation of the floor plan of the home. In addition, the GUI may include an element placement tool for use by the user to place graphics representing elements of the home monitor and control subsystem relative to the graphical representation of the floor plan of the home within the GUI.

By providing a GUI that includes a graphical representation of a floor plan of a home and one or more graphics representing one or more elements of a home monitor and control subsystem displayed within the context of the floor plan of the home, such as described herein, the exemplary systems and methods disclosed herein may provide a holistic, usable, intuitive, convenient, and/or functional user interface that promotes a quality user experience to a user who remotely monitors and/or controls one or more elements of the home monitor and control subsystem located at the user's home.

Examples of connected home systems and methods and associated GUI views will now be described in reference to the accompanying drawings.

Figure 1:
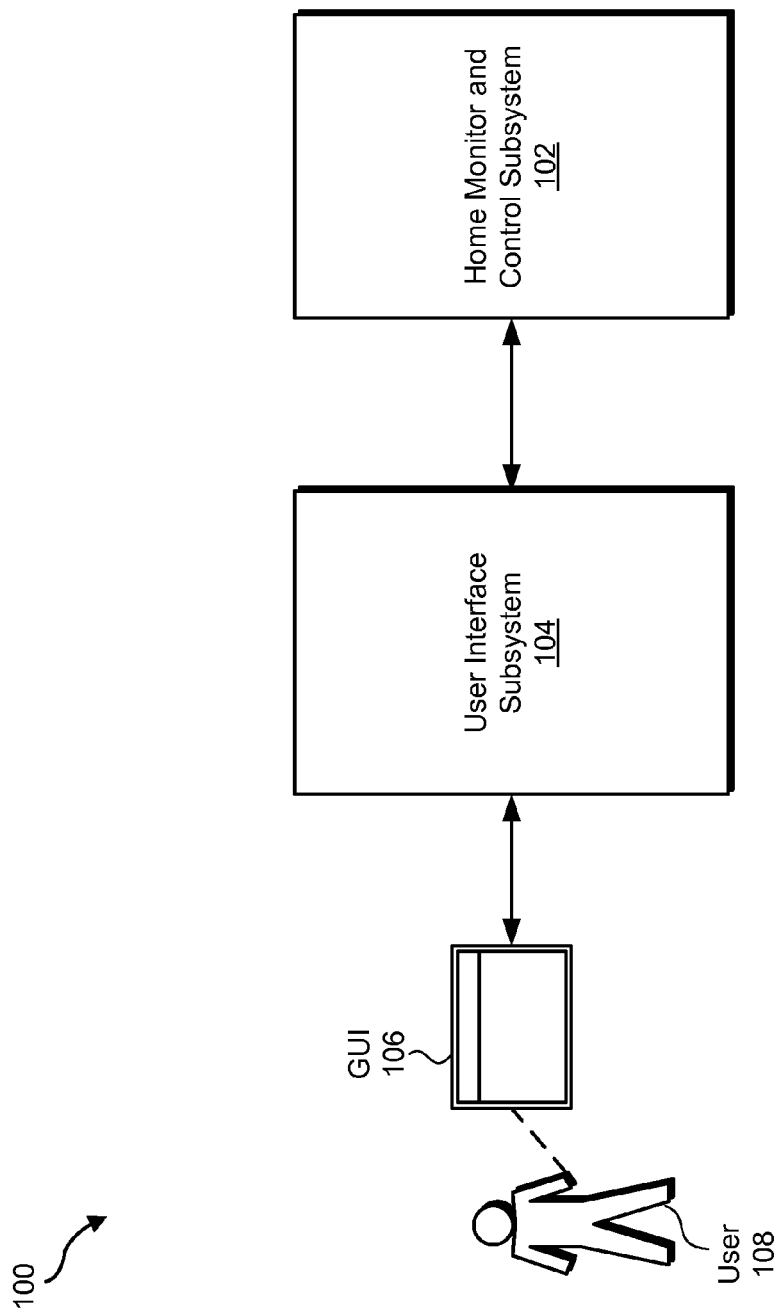
FIG. 1 illustrates an exemplary connected home system according to principles described herein.

FIG. 1 illustrates a connected home system 100 ("system 100"). As shown, system 100 may include a home monitor and control subsystem 102 and a user interface subsystem 104 in communication with one another.

Home monitor and control subsystem 102 and user interface subsystem 104 may communicate using any suitable communications technologies, including any communications technologies capable of supporting exchange of messages (e.g., control messages) and/or data between home monitor and control subsystem 102 and user interface subsystem 104. Examples of such communication technologies include, without limitation, Global System for Mobile Communications ("GSM") technologies, Long Term Evolution ("LTE") technologies, WiMax technologies, Code Division Multiple Access ("CDMA") technologies, Time Division Multiple Access ("TDMA") technologies, Evolution Data Optimized Protocol ("EVDO") (e.g., "1×EVDO"), radio frequency ("RF") signaling technologies, radio transmission technologies (e.g., One Times Radio Transmission Technology ("1×RTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, application program interfaces ("APIs"), other suitable communications technologies, and/or any combination or sub-combination thereof.

In certain implementations, communications between home monitor and control subsystem 102 and user interface subsystem 104 may be by way of one or more networks. For example, home monitor and control subsystem 102 and user interface subsystem 104 may communicate by way of any network or combination of networks provided by one or more appropriately configured network devices (and communication links thereto) and over which communications and data may be transported between home monitor and control subsystem 102 and user interface subsystem 104. For example, home monitor and control subsystem 102 and user interface subsystem 104 may communicate by way of a mobile phone network (e.g., a cellular phone network), a mobile data network (e.g., a 3G network, a 4G network, etc.), a telecommunications network, a wide area network (e.g., the Internet, a WiMax network, a mobile data network, etc.), a local area network (e.g., a home wired network such as an Ethernet network and/or a home wireless network such as a Wi-Fi network), any other network capable of transporting communications and data between home monitor and control subsystem 102 and user interface subsystem 104, and/or any combination or sub-combination thereof.

Home monitor and control subsystem 102 may include one or more elements configured to provide one or more features and/or functions at a home for remote control by way of user interface subsystem 104. Such elements may include one or more elements physically located and configured to perform one or more operations at the home. Examples of such elements include, without limitation, a security system and/or devices included therein (e.g., sensor devices, motion detection devices, siren devices, keypad devices, control devices, etc.), a surveillance system (e.g., a video and/or audio surveillance system) and/or devices included therein (e.g., camera devices, microphone devices, data recording devices, data storage devices, control devices, etc.), a door lock, a light fixture, an electrical switch, a thermostat, a window, a door, a servo motor, a garage door keypad, a home environment monitoring device (e.g., a smoke detector, a carbon monoxide detector, etc.), a personal health monitoring device (e.g., an oxygen level monitoring device, a heart rate monitoring device, etc.), an energy monitoring device (e.g., an appliance energy monitoring plug), a smart power strip (e.g., a smart power strip with surge protection), a smart appliance (e.g., a smart clothes washer, clothes dryer, dishwasher, refrigerator, freezer, water heater, etc.), a consumer electronics device (e.g., a set-top box, a television, a digital video recorder ("DVR"), etc.), and any other system or device that is located at the home, configured to perform one or more operations at the home, and is capable of being remotely controlled and/or accessed by a user by way of user interface subsystem 104.

In certain examples, home monitor and control subsystem 102 may also include one or more elements located remote of the home and configured to provide remote connectivity between user interface subsystem 104 and one or more elements located at the home. For example, home monitor and control subsystem 102 may include one or more server devices configured to communicate with one or more elements of home monitor and control subsystem 102 located at the home (e.g., by way of a wide area network).

User interface subsystem 104 may include and/or be implemented by one or more computing devices communicatively coupled, directly or indirectly, to one or more elements of home monitor and control subsystem 102 located at the home. In certain examples, user interface subsystem 104 may include a user computing device (e.g., a mobile device, a computer, etc. operated by the user) configured to communicate with one or more elements of home monitor and control subsystem 102. In additional examples, user interface subsystem 104 may include one or more server devices configured to communicate with one or more elements of home monitor and control subsystem 102 (e.g., by way of a wide area network).

User interface subsystem 104 may be configured to provide a user interface for use by a user to interact with home monitor and control subsystem 102. For example, user interface subsystem 104 may provide a GUI 106 for display on a display screen for consideration and/or use by a user 108. Exemplary views of GUI 106 are described in detail herein.

Figure 2:
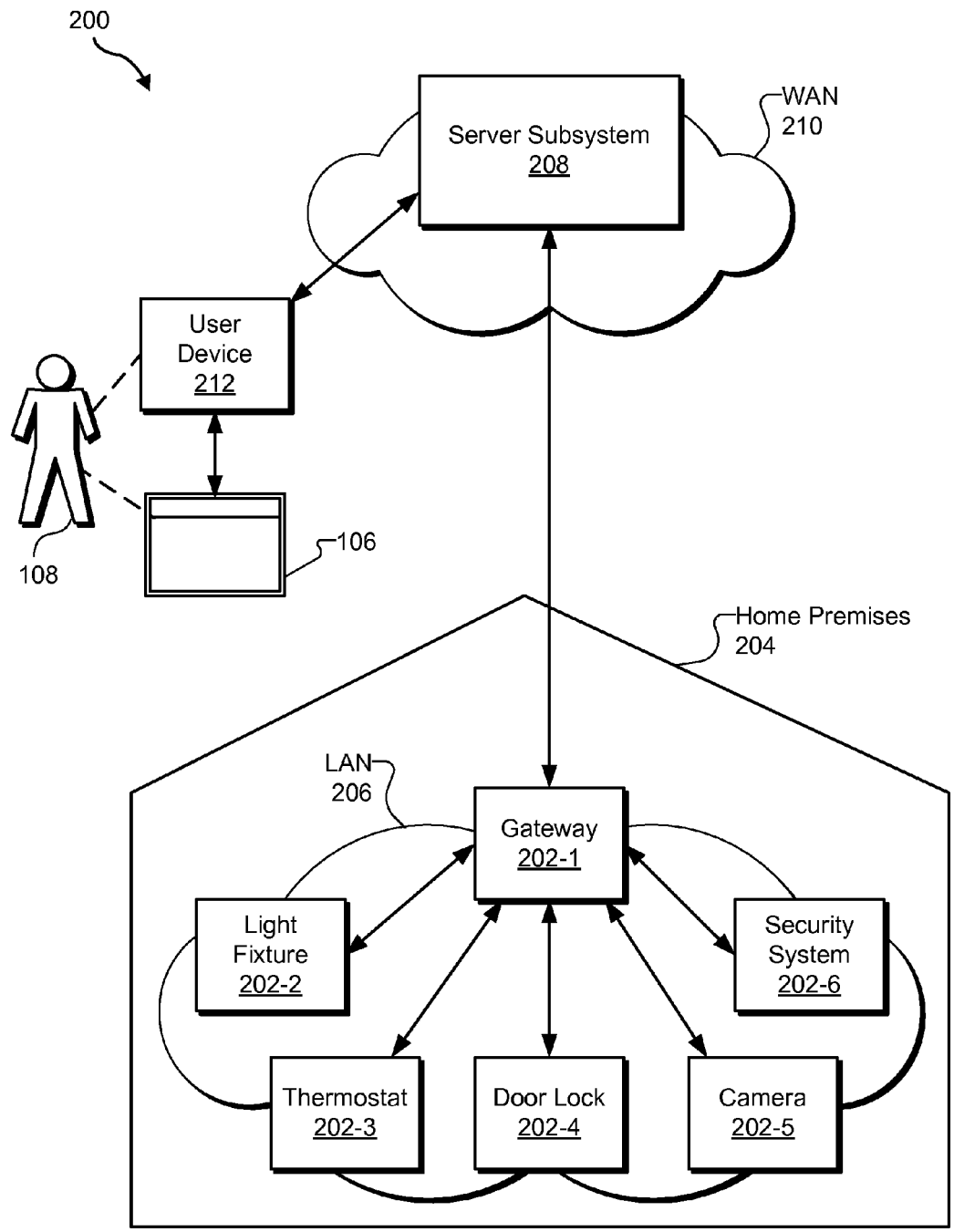
FIGS. 2-3 illustrate exemplary implementations of the connected home system of FIG. 1 according to principles described herein.

FIG. 2 illustrates an exemplary implementation 200 of system 100. As shown, implementation 200 may include elements 202 (e.g., elements 202-1 through 202-6) of home monitor and control subsystem 102 physically located at a home premises 204. In the example shown in FIG. 2, elements 202 include a gateway device 202-1 configured to communicate with a light fixture device 202-2, a thermostat device 202-3, a door lock device 202-4, a video camera device 202-5, and a security system device 202-6 physically located and configured to perform one or more operations at home premises 204.

Gateway device 202-1 may be configured to communicate with elements 202-2 through 202-6 to obtain information from elements 202-2 through 202-6 and/or to control operation of elements 202-2 through 202-6. For example, gateway device 202-1 may communicate with light fixture device 202-2 to request and receive data representing information about light fixture device 202-2, including information about the status of the light fixture device 202-2 (e.g., information indicating that a light included in the light fixture device 202-2 is on or off and/or information about energy consumption by the light fixture device 202-2). Additionally or alternatively, gateway device 202-1 may communicate with light fixture device 202-2 to instruct the light fixture device 202-2 to turn the light in the light fixture device 202-2 on or off. In this or a similar manner, gateway device 202-1 may communicate with any other element 202 communicatively coupled to the gateway device 202-1 to obtain information about and/or control operation of the element 202.

Gateway device 202-1 may communicate with any of the other elements 202-2 through 202-6 in any suitable way, including by way of one or more direct connections with any of the other elements 202-2 through 202-6 and/or by way of a local area network, such as a local area network ("LAN") 206 located at home premises 204 as shown in FIG. 2. LAN 206 may include any suitable local area network, such as an Ethernet or Wi-Fi network.

Gateway device 202-1 may also communicate with a remote server subsystem 208, which may include or more server devices, using any suitable communication technologies. For example, gateway device 202-1 may communicate with server subsystem 208 by way of a wide area network ("WAN") 210 such as the Internet, a WiMax network, a data network, a media content access network, a proprietary wide area network, or any other suitable wide area network. Accordingly, server subsystem 208 may obtain information about elements 202 from elements 202 and/or provide instructions to elements 202 by way of gateway device 202-1.

Server subsystem 208 may also communicate with a user device 212 associated with user 108 (e.g., operated by user 108) using any suitable communication technologies. For example, server subsystem 208 may communicate with user device 212 by way of WAN 210 as shown in FIG. 2, or by way of another wide area network different from WAN 210 in other embodiments.

User device 212 may comprise any computing device operable by user 108. For example, user device 212 may include, without limitation, a personal computer, a mobile phone, a smart phone, a tablet computer, a set-top box device, a digital video recorder ("DVR") device, a television, a gaming device, a portable media player device, a mobile computing device, and/or any other client-side computing device configured to perform one or more operations of user device 212 described herein.

As shown in FIG. 2, user device 212 may be configured to provide GUI 106 to user 108. For example, user device 212 may include a display screen or be communicatively coupled to another device having a display screen and may provide data representative of GUI 106 for display on the display screen for viewing and/or interaction by user 108. Accordingly, user 108 may utilize user device 212 to receive output and/or provide input through GUI 106 to remotely monitor and/or control elements 202 of home monitor and control subsystem 102 when user 108 is away from home premises 204.

Figure 3:
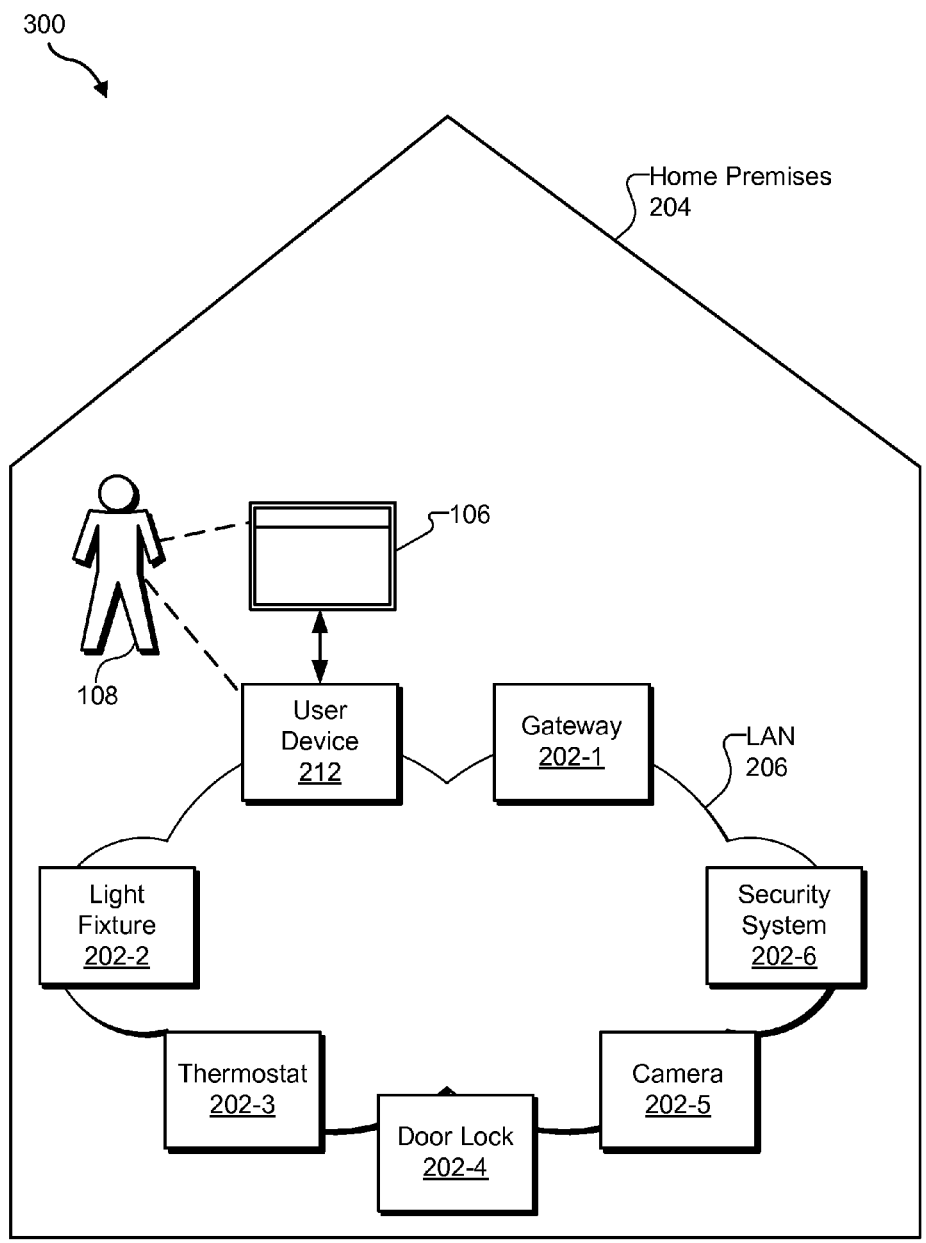

Additionally or alternatively, user 108 may utilize user device 212 to remotely monitor and/or control elements 202 of home monitor and control subsystem 102 when user 108 is located at home premises 204 and remote of elements 202 (e.g., when user 108 utilizes user device 212 at a location within home premises 204 that is remote of the location of an element 202 within home premises 204). FIG. 3 illustrates an exemplary implementation 300 of system 100 in which user device 212 is located at home premises 204 and configured to communicate with one or more elements 202 by way of LAN 206. For example, user device 212 may communicate with gateway device 202-1 by way of LAN 206 to obtain information about elements 202 and/or to provide instructions to elements 202. Alternatively, user device 212 may communicate with any other element 202 by way of LAN 206 or by way of another local connection (e.g., a direct local connection to an element 202) to obtain information about the element 202 and/or to provide instructions to the element 202.

Figure 4:
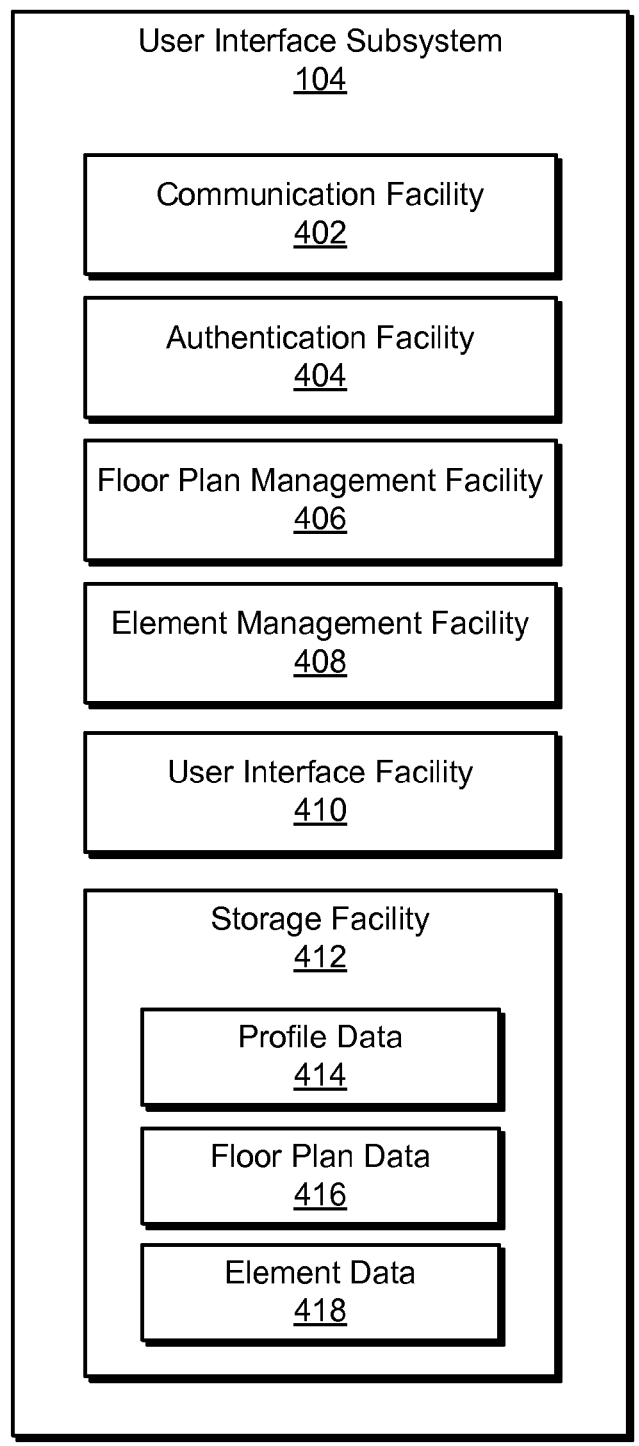
FIG. 4 illustrates exemplary components of a user interface subsystem included in the connected home system of FIG. 1 according to principles described herein.

FIG. 4 illustrates exemplary components of user interface subsystem 104. As shown, user interface subsystem 104 may include, without limitation, a communication facility 402, an authentication facility 404, a floor plan management facility 406, an element management facility 408, a user interface facility 410, and a storage facility 412 selectively and communicatively coupled to one another. It will be recognized that although facilities 402-412 are shown to be separate facilities in FIG. 1, any of facilities 402-412 may be combined into fewer facilities, such as into a single facility, or divided into more facilities as may serve a particular implementation.

Storage facility 412 may be configured to store data generated and/or used by any of the other facilities 402-410. For example, storage facility 412 may store profile data 414 representing one or more user, device, and/or home profiles, floor plan data 416 representing one or more floor plans of one or more home premises, and element data 418 representing information about one or more elements of home monitor and control subsystem 102. Storage facility 412 may store additional or alternative data as may serve a particular implementation.

Communication facility 402 may be configured to facilitate communications between user interface subsystem 104 and one or more computing devices, applications, processes, and/or interfaces external of user interface subsystem 104. For example, communication facility 402 may be configured to send and receive communication to/from one or more elements 202 of home monitor and control subsystem 102, user device 212, server subsystem 208, and/or any applications and/or processes associated with elements 202 of home monitor and control subsystem 102, user device 212, and/or server subsystem 208.

Any suitable communication technologies, including any of those disclosed herein, may be employed by communication facility 402 for such communications. For example, communication facility 402 may include and/or be configured to communicate with one or more application program interfaces (APIs). As another example, communication facility 402 may be configured to communicate over WAN 210 and/or LAN 206.

Authentication facility 404 may be configured to authenticate the user and/or a computing device to user interface subsystem 104 before granting the user and/or the computing device access to a user interface provided by user interface subsystem 104. Authentication facility 404 may employ any suitable authentication technologies that may be useful to ensure that only authorized users and/or computing devices are granted access to a user interface provided by user interface subsystem 104. In certain examples, authentication facility 404 may utilize profile data 414 stored in storage facility 412 to authenticate users and/or computing devices represented by the profile data 414.

Floor plan management facility 406 may be configured to manage data representative of a floor plan of a home. Such data may be stored as floor plan data 416 in storage facility 412 and may specify a physical layout of one or more floors of a home. A floor plan represented by floor plan data 416 may be to scale or not to scale and may include data representative of one or more components of a home, including, but not limited to, walls, doors, windows, cabinets, countertops, toilets, sinks, etc. Floor plan data 416 representing a floor plan may include information that is of use to user interface subsystem 104 to generate a graphical representation of the floor plan in GUI 106. Floor plan management facility 406 may be configured to associate data representative of a floor plan with a particular user, computing device, and/or home profile.

In certain examples, floor plan management facility 406 may provide functionality to support end user definition of a floor plan. For example, floor plan management facility 406 may provide a floor plan definition tool for use by a user to define a floor plan (e.g., a floor plan of the user's home) in a user interface provided by user interface subsystem 104 (e.g., within GUI 106). Using the tool, the user may define and/or modify the floor plan. An example of a floor plan definition tool is described in more detail further below.

Element management facility 408 may be configured to manage data representative of one or more elements of home monitoring and control subsystem 102. To this end, element management facility 408 may communicate with home monitor and control subsystem 102 (e.g., by way of communication facility 402) to request and receive information about one or more elements of home monitor and control subsystem 102. Element management facility 408 may store this information as element data 418 in storage facility 412. Element data 418 may include any information descriptive of one or more elements of home monitor and control subsystem 102, including, without limitation, a description of an element, a connection status of an element, an operation status of an element, settings information for an element, historical notification information for an element, data recording information for an element, a graphic associated with an element, and/or any other information associated with an element.

Element management facility 408 may be configured to request element information from home monitor and control subsystem 102 periodically, in accordance with a predefined schedule, and/or in response to occurrences of predefined events. In certain examples, element management facility 408 may request and receive element information from home monitor and control subsystem 102 in real time such that element data 418 is representative of current, real-time information about one or more elements of home monitor and control subsystem 102.

Element management facility 408 may be further configured to generate and provide instructions to one or more elements of home monitor and control subsystem 102 (e.g., by way of communication facility or 02). Such instructions may be useful by home monitor and control subsystem 102 to control operation of one or more elements of home monitor and control subsystem 102. For example, element management facility 408 may generate and provide an instruction to turn on a light included in a light fixture element included in home monitor and control subsystem 102. Element management facility 408 may provide data representative of the instruction to home monitor and control subsystem 102 (by way of communication facility 402), and home monitor and control subsystem 102 may communicate with the light fixture element to instruct it to turn on the light included in the light fixture element.

User interface facility 410 may be configured to provide a user interface for presentation to a user. In providing the user interface, user interface facility 410 may request and receive data from floor plan management facility 406 and element management facility 408 and use the data received from these facilities 406 and 408 to provide the user interface. Accordingly, the user interface may include information about a floor plan of a home and elements of home monitor and control subsystem 102.

User interface facility 410 may provide a user interface for presentation to a user in any suitable way. In certain examples, the user interface may include a GUI such as GUI 106 and the providing of the user interface may include user interface facility 410 rendering the GUI for display on a display screen. In certain examples, the providing of the user interface may include user interface facility 410 transmitting data that may be used to render the GUI. For instance, user interface facility 410 may transmit data to user device 212, a graphics component (e.g., a graphics engine) of user device 212, or a process (e.g., an operating system process) or application (e.g., a web browser application, a client application, a mobile application ("app"), etc.) running on user device 212, for use in rendering or otherwise generating a GUI for display on a display screen for viewing and interaction by a user.

Figure 5:
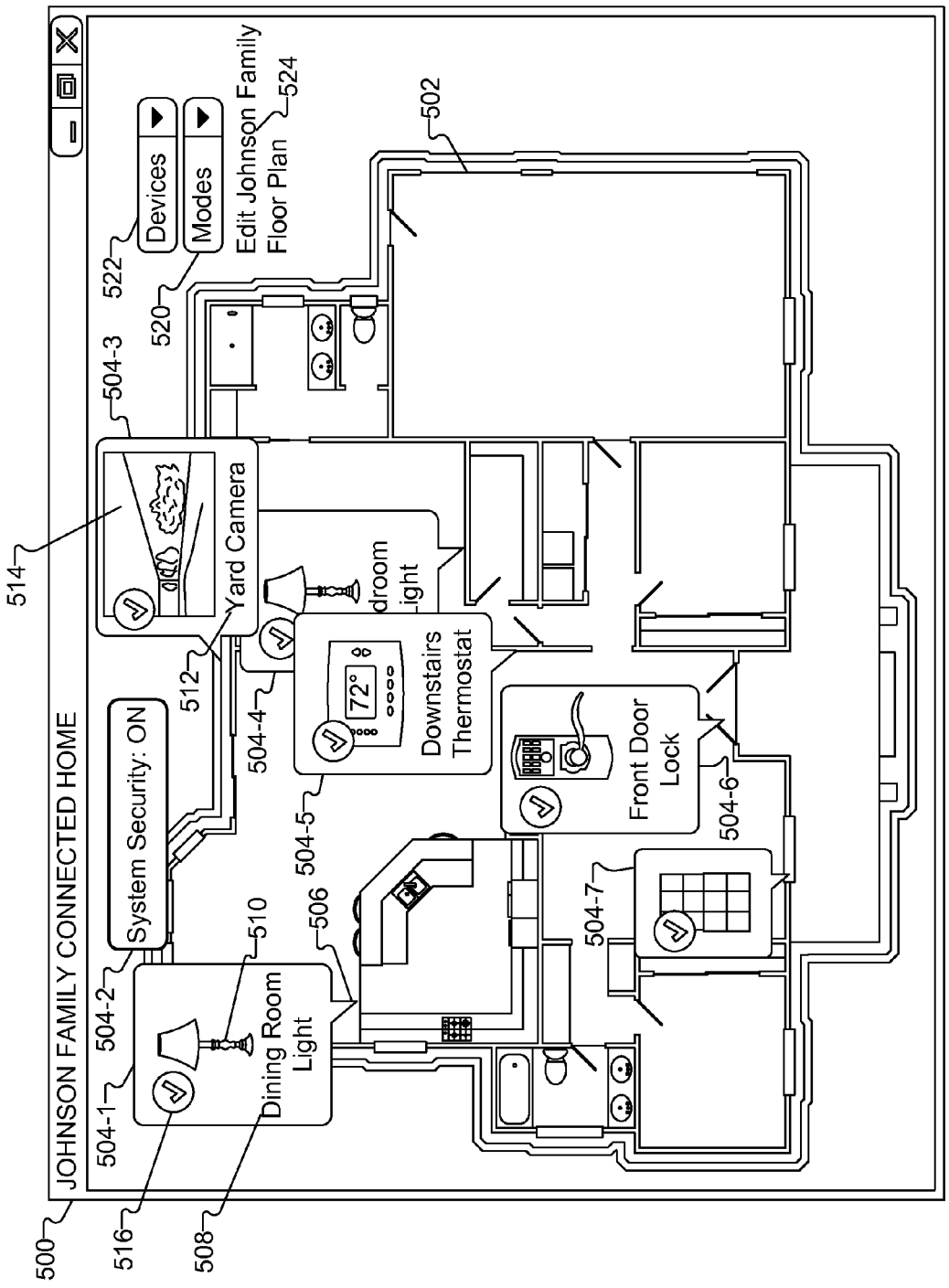
FIGS. 5-13 illustrate exemplary graphical user interface views provided by the user interface subsystem included in the connected home system of FIG. 1 according to principles described herein.

Exemplary GUI views that may be provided by user interface facility 410 of user interface subsystem 104 will now be described. FIG. 5 illustrates a GUI view 500 displayed on a display screen and that includes a graphical representation 502 of a floor plan of a home. As shown, graphical representation 502 of the floor plan visually indicates, by way of a top-down cutaway view of the home, a physical layout of a floor of the home and shows locations of components of the home such as doors, windows, walls, rooms, closets, cabinets, countertops, etc. While FIG. 5 illustrates one example of a graphical representation 502 of a floor plan of a home, any suitable graphical representation of a floor plan of a home may be used in other examples.

As further shown in FIG. 5, GUI view 500 also includes graphics 504 (e.g., graphics 504-1 through 504-7) representing elements of home monitor and control subsystem 102 located at the home. In the illustrated example, graphic 504-1 represents a light fixture, graphic 504-2 represents a security system, graphic 504-3 represents a video camera, graphic 504-4 represents another light fixture, graphic 504-5 represents a thermostat, graphic 504-6 represents a door lock, and graphic 504-7 represents a window sensor at the home.

As illustrated in FIG. 5, graphics 504 are displayed together with and positioned relative to the graphical representation 502 of the floor plan of the home in GUI view 500 to visually indicate, within the context of the floor plan, locations of the elements at the home. For example, graphic 504-1 includes a callout window overlaid on the graphical representation 502 of the floor plan of the home at a position that visually indicates a location of the element (e.g., the light fixture) represented by graphic 504-1 relative to the floor plan. Specifically, graphic 504-1 includes an arrow 506 of a callout window that visually points to a position on the graphical representation 502 of the floor plan to indicate a location of the corresponding element at the home. In the illustrated example, graphic 504-1 indicates that the element represented by graphic 504-1 is located within a dining room area of the home. Other graphics 504-2 through 504-7 also visually indicate respective locations of the elements represented by the graphics 504-2 through 504-7 relative to the floor plan of the home. Accordingly, a user viewing GUI view 500 may conveniently and intuitively ascertain locations of elements of home monitor and control subsystem 102 at the home relative to the floor plan of the home.

Graphics 504 may present information associated with the elements of home monitor and control subsystem 102 represented by the graphics 504. For example, any of the graphics 504 may include a description of the element represented by the element, such as a textual description of the element and/or a visual image descriptive of the element. To illustrate, graphic 504-1 includes a textual description 508 indicating that the element represented by graphic 504-1 is a "dining room light" and a visual image 510 of a light fixture. To illustrate another example, graphic 504-3 includes a textual description 512 indicating that the element represented by graphic 504-3 is a "yard camera" and a visual image 514 representing a view captured by the yard camera. For example, the element represented by graphic 504-3 may comprise a video camera, and graphic 504-3 may include a display of a video feed captured by the video camera (e.g., a live video feed from the video camera) or of a still image from a video feed captured by the video camera.

In certain examples, graphics 504 may indicate current connection statuses of the elements represented by graphics 504. As used herein, the term "current connection status" of an element represents a current, real-time status of a communicative connection of an element to user interface subsystem 104. When the current connection status of an element is "connected," the element is communicatively connected to user interface subsystem 104 such that user interface subsystem 104 is able to obtain information from element and/or provide instructions to the element. When the current connection status of the element is "disconnected," the element is not communicatively connected in a way that allows the user interface subsystem 104 to obtain information from the element and/or provide instructions to the element.

Figure 6:
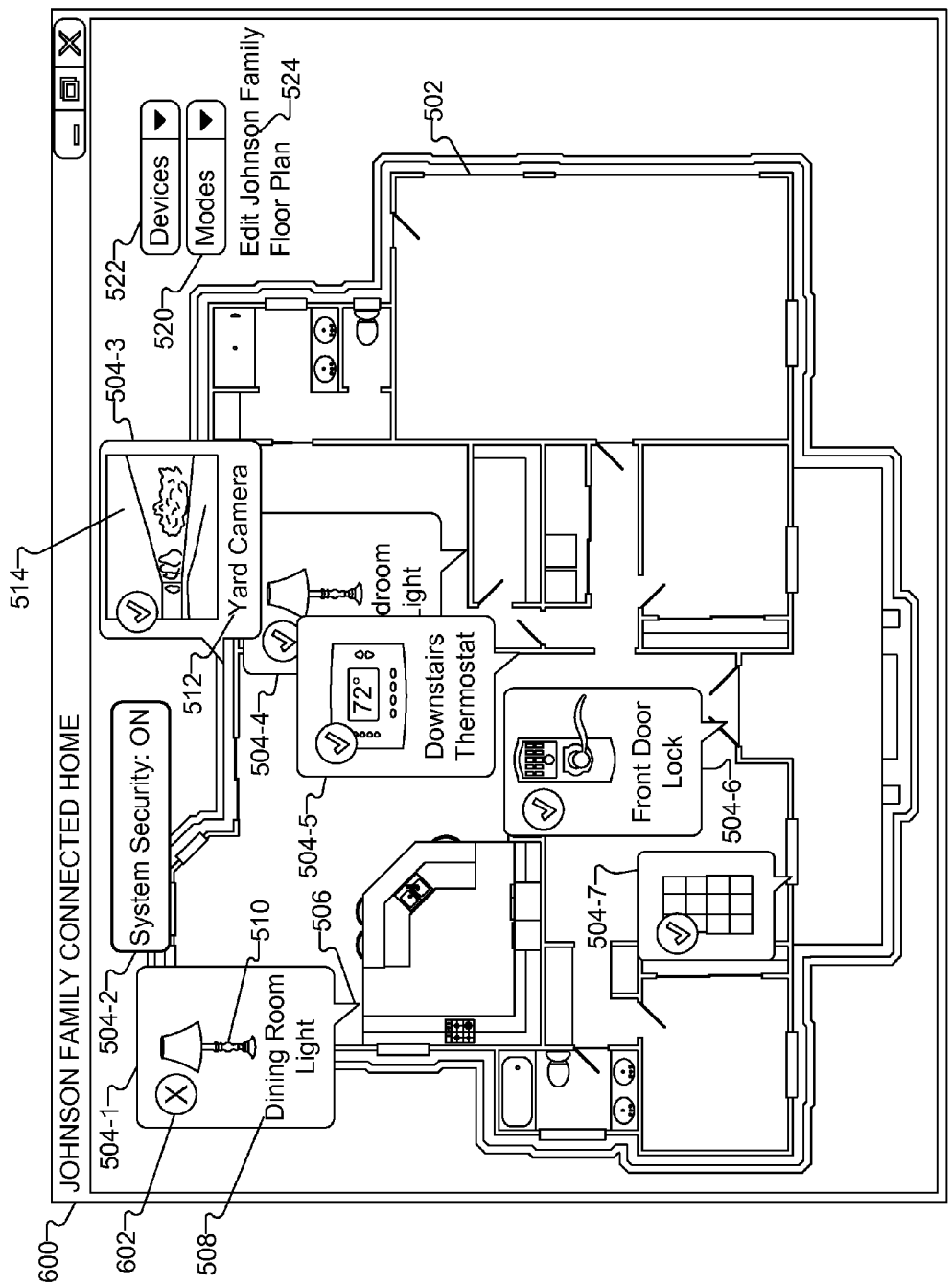

In the example illustrated in FIG. 5, graphics 504 indicate the current connection statuses of the elements represented by graphics 504. For example, graphic 504-1 includes a graphical object 516 that indicates that the current connection status of the element represented by graphic 504-1 is "connected." The other graphics 504-2 through 504-7 similarly indicate that the current connection statuses of their respective elements are also "connected." If the element represented by graphic 504-1 becomes disconnected, graphic 504-1 may be updated in real time by replacing graphical object 516 with another graphical object that indicates that the current connection status of the element represented by graphic 504-1 is "disconnected." For example, FIG. 6 shows a GUI view 600 in which graphical object 516 has been replaced by graphical object 602 to show that the element represented by graphic 504-1 is currently "disconnected."

In certain examples, graphics 504 may indicate current operational statuses of the elements represented by graphics 504. As used herein, the term "current operational status" of an element represents a current state of operation of the element. When the current operational status of an element is "on," the element is operating in an "on" state. When the current operational status of the element is "off," the element is operating in an "off" state. Examples of other operational states of elements include, without limitation, "closed" (e.g., a door or window is closed), "open" (e.g., a door or a window is open), "recording" (e.g., a video camera is currently recording), "not recording" (e.g., a video camera is not currently recording), "heating" (e.g., a heating system is currently heating or in a heat operational state), "cooling" (e.g., a cooling system is currently cooling or in a cool operational state), "locked," "unlocked," "armed" (e.g., a security system or component of a security system is armed), "disarmed" (e.g., a security system or component of a security system is disarmed), and "error" (e.g., an element is in an error state).

Figure 7:
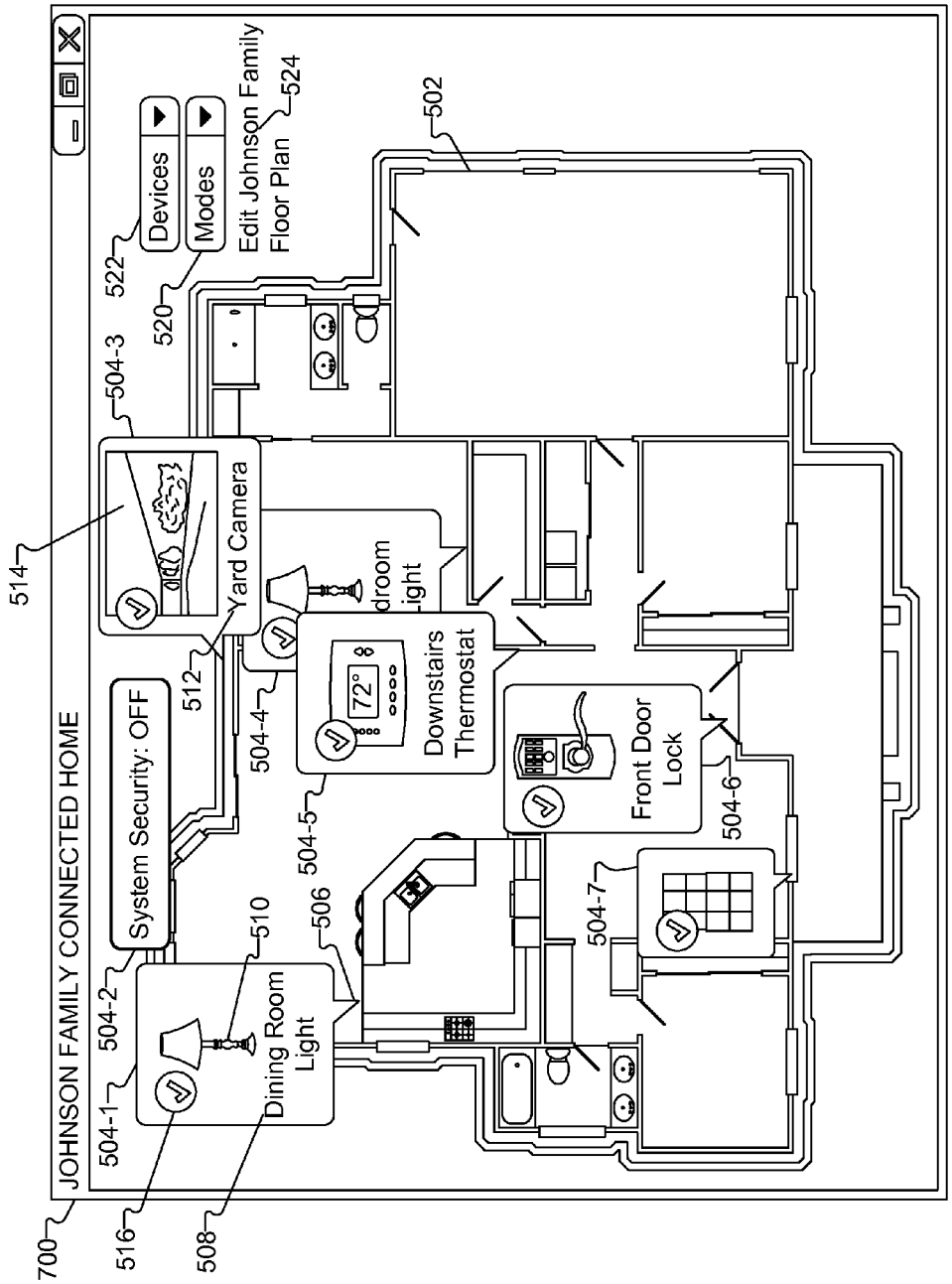

In the example illustrated in FIG. 5, graphic 504-2 indicates that the current operational status of the element represented by graphic 504-2 is "on." If the element represented by graphic 504-1 changes from an "on" state of operation to an "off" state of operation, graphic 504-2 may be updated in real time to indicate that the current operational status of the element represented by graphic 504-1 is "off." For example, FIG. 7 shows a GUI view 700 in which graphic 504-2 indicates that the current operational status of the element represented by graphic 504-1 is "off."

Figure 8:
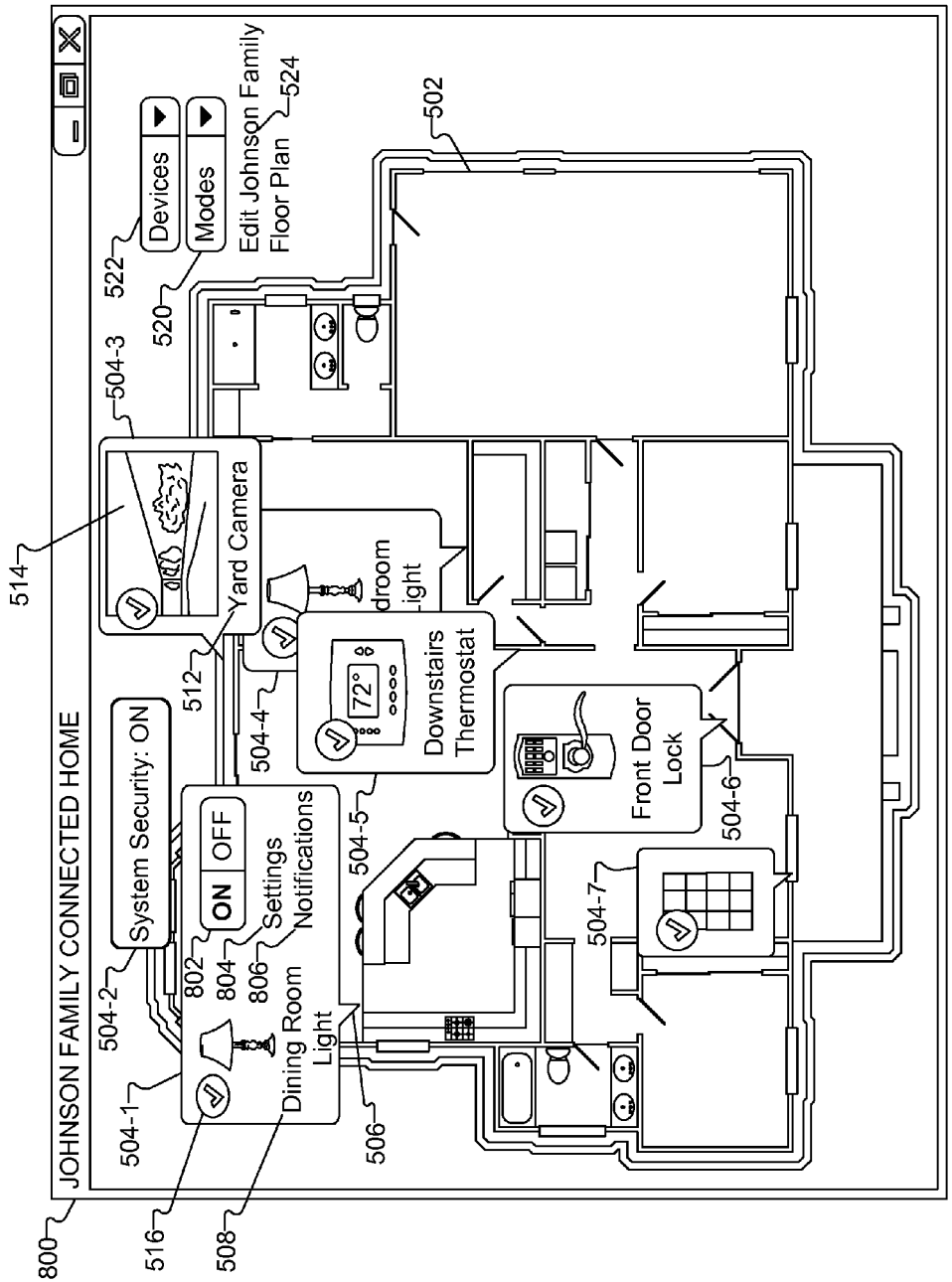

In certain examples, graphics 504 may include one or more options configured to be selected by a user to control operation of elements represented by graphics 504. To illustrate, FIG. 8 shows a GUI view 800 in which graphic 504-1 includes a graphical object 802 indicating that an operational status of a light fixture represented by graphic 504-1 is "on" such as by bolding or otherwise visually differentiating an "on" indicator from an "off" indicator in graphical object 802. Graphical object 802 may be further configured to function as a user selectable option configured to be selected by a user to control operation of the light fixture. For example, a user may provide input in GUI view 800 to select the "off" indicator within graphical object 802 in order to change the state of operation of the light fixture from "on" to "off." User interface subsystem 104 may detect the user input and in response generate and send an instruction to direct home monitor and control subsystem 102 to turn off a light included in the light fixture. Home monitor and control subsystem 102 may then communicate with the light fixture to turn off the light.

Graphical object 802 included in graphic 504-1 is just one example of a graphic 504 providing an option for selection by a user to control operation of an element of home monitor and control subsystem 102. Other such examples are described herein.

In certain examples, graphics 504 may include one or more user selectable links to additional information for elements represented by graphics 504. As an example, graphic 504-1 includes a user selectable link 804 to settings information for the element represented by graphic 504-1. User interface subsystem 104 may detect a user selection of link 804 and respond by providing settings information for the element for display to the user. The settings information may include any information about the settings of the element represented by graphic 504-1. As another example, graphic 504-1 includes a user selectable link 806 to notification information for the element represented by graphic 504-1. User interface subsystem 104 may detect a user selection of link 806 and respond by providing notification information for the element for display to the user. The notification information may include any information about notifications related to the element represented by graphic 504-1, such as historical notification information about notifications related to the element and that have been provided to a user by user interface subsystem 104 and/or home monitor and control subsystem 102 in the past.

In certain examples, graphic 504-1 shown in FIG. 8 may be displayed in response to user input. For example, while GUI view 500 is displayed as shown in FIG. 5, a user may select graphic 504-1 shown in FIG. 5. User interface subsystem 104 may detect the user selection and respond by displaying the version of graphic 504-1 shown in FIG. 8 to provide the user with additional information (e.g., current operations status information), options (e.g., an option to turn the light fixture on or off), and/or links (e.g., links 804 and 806) to additional information about the light fixture within graphic 504-1.

Figure 9:
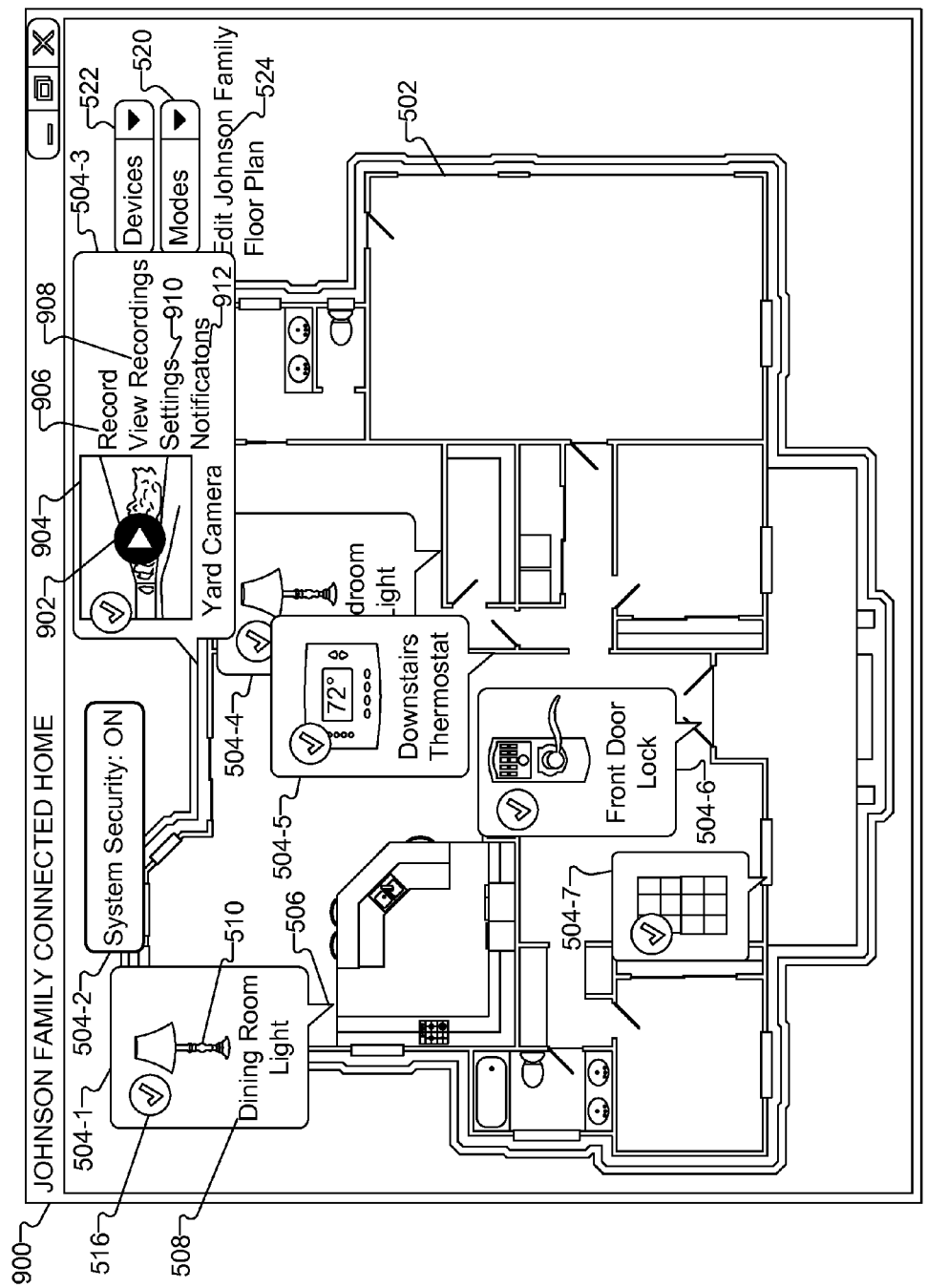

FIG. 9 illustrates another example of user selectable options and links included in a graphic 504 representing an element of home monitor and control subsystem 102 and displayed in a GUI view 900. As shown, in some examples, graphic 504-3 may include a user selectable option 902 to control playback of video within graphic 504-3. In the illustrated example, a user may select option 902 to initiate playback of video captured by the video camera represented by graphic 504-3 in a video playback window 904 within graphic 504-3. User interface subsystem 104 may detect the user selection of option 902 and respond by initiating playback of video captured by the video camera. The video being played back may comprise live video captured by the video camera or video previously captured by video camera and recorded by home monitor and control subsystem 102.

As further shown in FIG. 9, in some examples, graphic 504-3 may include a user selectable option 906 to control recording by the video camera represented by graphic 504-3. In the illustrated example, a user may select option 906 to initiate recording of video by the video camera represented by graphic 504-3.

As further shown in FIG. 9, in some examples, graphic 504-3 may include a user selectable link 908 to recording information related to the video camera represented by graphic 504-3. User interface subsystem 104 may detect a user selection of link 908 and respond by providing recording information for the element for display to the user. The recording information may include any information about recordings captured by the element represented by graphic 504-1, such as a list of previously captured recordings and/or links configured to be selected by the user to launch playback of the recordings. Graphic 504-3 may further include a user selectable link 910 to settings information for the video camera represented by graphic 504-3 and/or a user selectable link 912 to notification information related to the video camera.

In certain examples, graphic 504-3 shown in FIG. 9 may be displayed in response to user input. For example, while GUI view 500 is displayed as shown in FIG. 5, a user may select graphic 504-3 shown in FIG. 5. User interface subsystem 104 may detect the user selection and respond by displaying the version of graphic 504-3 shown in FIG. 9 to provide the user with additional options (e.g., an option to control video playback and an option to control recording by the video camera) and/or links (e.g., links 908, 910, and 912) to additional information about the video camera within graphic 504-3.

Figure 10:
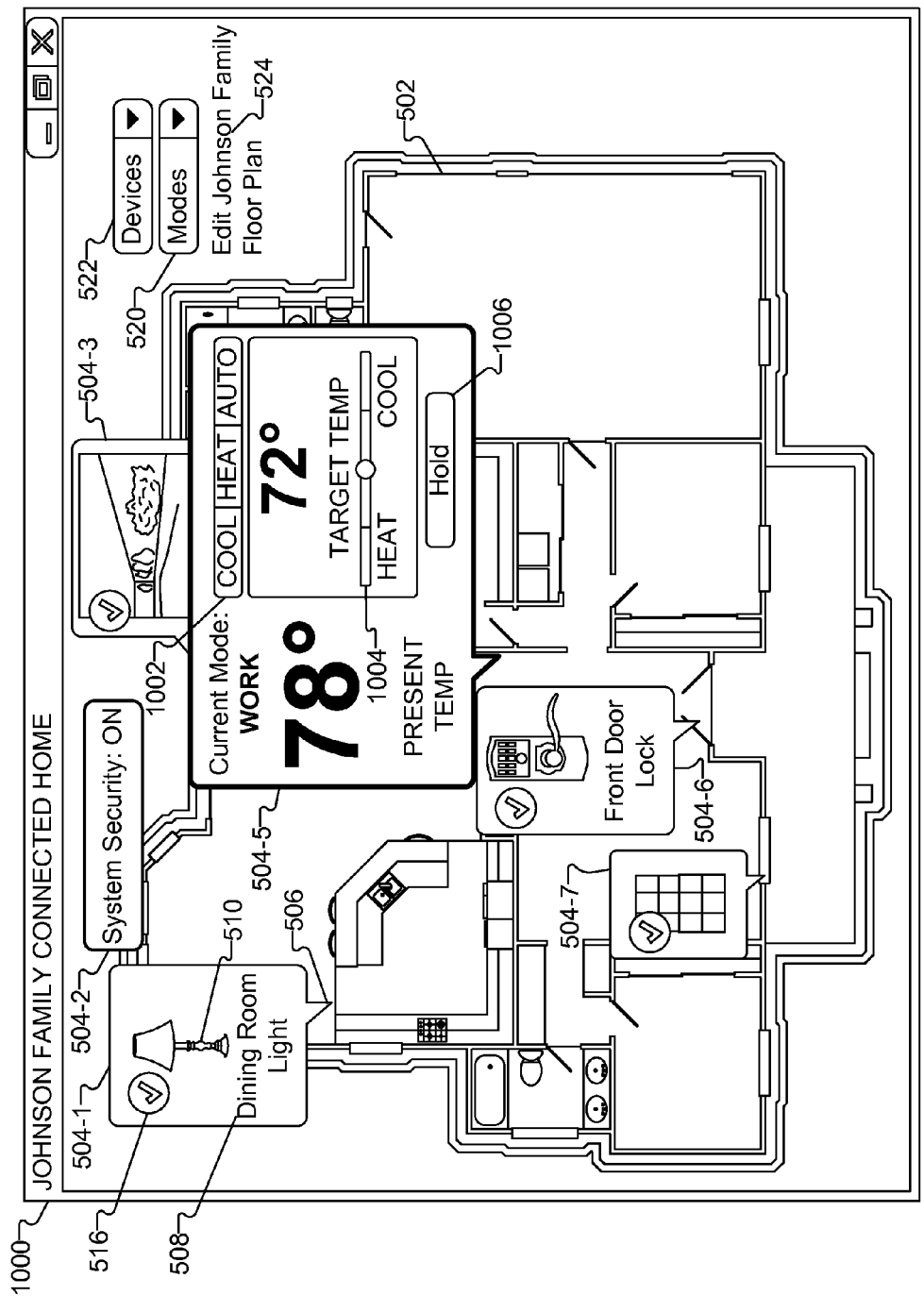

FIG. 10 illustrates another example of user selectable options included in a graphic 504 representing an element of home monitor and control subsystem 102 and displayed within a GUI view 1000. As shown, in some examples, graphic 504-5 may include user selectable options to control operation of a thermostat represented by graphic 504-5. For example, graphic 504-5 may include an option 1002 to select a "cool," "heat," or "auto" state of operation for the thermostat, an option 1004 to select a target temperature for the thermostat, and an option 1006 to instruct the thermostat to hold the temperature at the current temperature or the current target temperature. Graphic 504-3 may further indicate the present temperature determined by the thermostat and/or a current selected mode of home monitor and control subsystem 102 that applies to the thermostat. Examples of such modes are described further below.

In certain examples, graphic 504-5 shown in FIG. 10 may be displayed in response to user input. For example, while GUI view 500 is displayed as shown in FIG. 5, a user may select graphic 504-5 shown in FIG. 5. User interface subsystem 104 may detect the user selection and respond by displaying the version of graphic 504-5 shown in FIG. 10 to provide the user with additional information (e.g., current room temperature determined by the thermostat and/or a current mode of operation of home monitor and control subsystem 102 that applies to the thermostat) and/or options (e.g., an option to select a state of operation of the thermostat, an option to adjust the target temperature of the thermostat, and/or an option to hold the temperature and the current temperature or current target temperature) related to the thermostat.

In any of the ways described herein, GUI 106 provided by user interface subsystem 104 may facilitate user interaction with individual elements of home monitor and control subsystem 102 within the context of a view of a floor plan of a home. For example, a user may interact with graphic 504-1 shown in FIG. 8 to individually control operation of the light fixture represented by graphic 504-1, with graphic 504-3 shown in FIG. 9 to individually control operation of the video camera represented by graphic 504-3, and/or with graphic 504-5 shown in FIG. 10 to individually control operation of the thermostat represented by graphic 504-5. Such interactions may be performed within the context of a GUI view that includes graphics 504 displayed relative to graphical representation 502 of a floor plan of a home, which may provide the user with a holistic GUI view through which to remotely monitor and control elements of home monitor and control subsystem 102.

Returning to FIG. 5, GUI view 500 may include a "modes" option 520 configured to be selected by a user to access information and/or options associated with defined operational modes of home monitor and control subsystem 102. As used herein, an "operational mode" of home monitor and control subsystem 102 refers to a predefined mode of operation in which multiple elements of home monitor and control subsystem 102 located at a home operate in accordance with predefined settings. For example, a user may want certain elements of home monitor and control subsystem 102 to operate in particular ways during the day, at night, while the user is at work, or while the user is otherwise away from home (e.g., when the user is traveling). The user may provide input to define an operational mode, associate elements of home monitor and control subsystem 102 with the operational mode, and define settings of the associated elements. Thereafter, the user may simply activate the operational mode to cause the associated elements of home monitor and control subsystem 102 to operate in accordance with the defined settings or deactivate the operational mode to cause the associated elements of home monitor and control subsystem 102 to operate in accordance with the settings of the elements before the operational mode was activated.

User interface subsystem 104 may provide a user with single-input control over operational modes of home monitor and control subsystem 102 and, consequently, over multiple elements associated with the operational modes. To illustrate, a user may provide input to select the "modes" option 520 shown in FIG. 5. User interface subsystem 104 may detect the selection and respond by providing a populated list of operational modes of home monitor and control subsystem 102. The populated list of operational modes may include options configured to facilitate the user activating or deactivating an operational mode included in the list.

Figure 11:
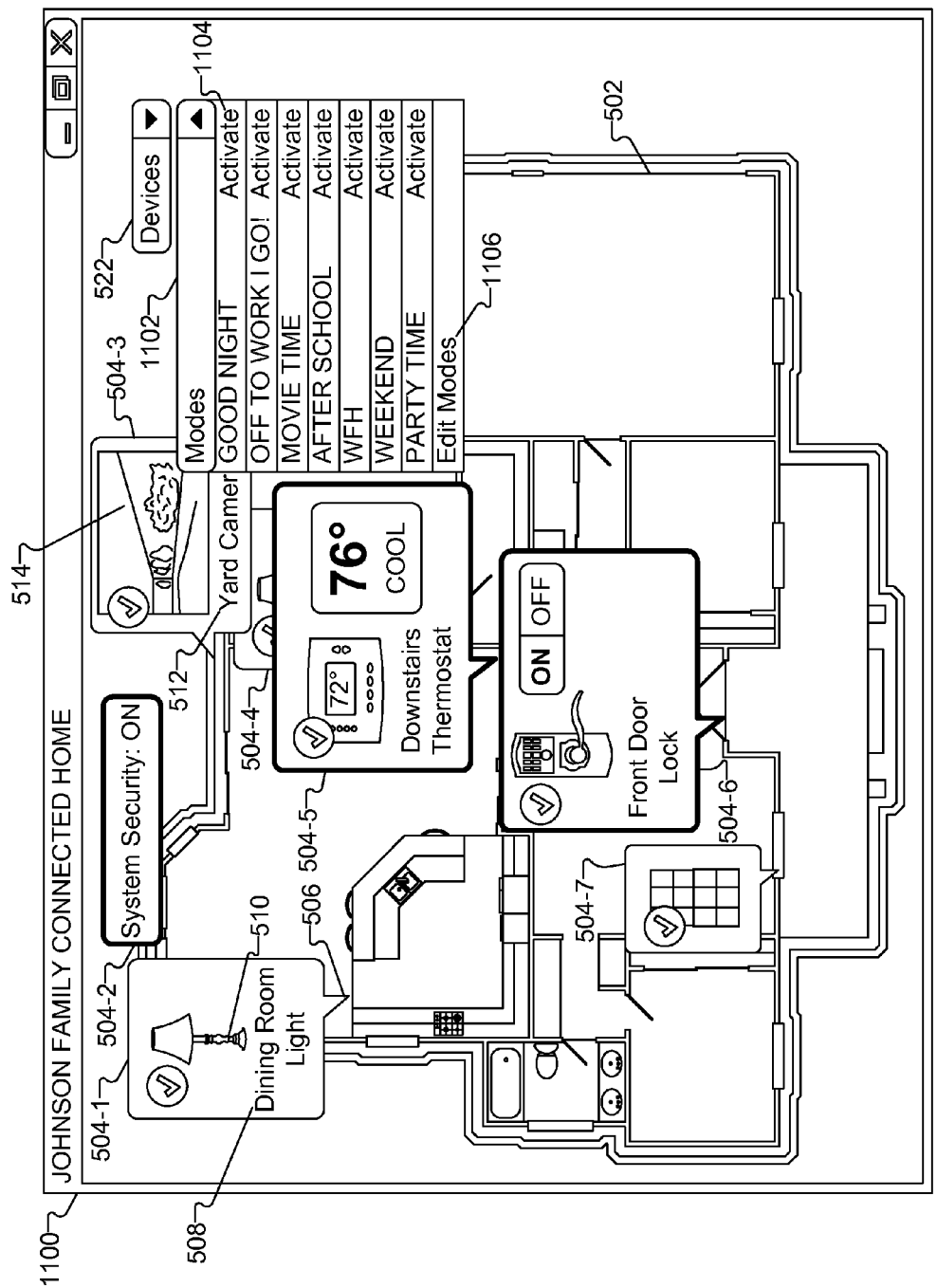

To illustrate, FIG. 11 shows a GUI view 1100 that may be displayed in response to a user selection of the "modes" option 520 shown in FIG. 5. As shown, GUI view 1100 may include a populated list 1102 of operational modes. In the illustrated example, list 1102 includes data representative of multiple operational modes titled "good night," "off to work I go," "movie time," "after school," "WFH," "weekend," and "party time." The list 1102 further includes options configured to be selected by a user to activate any of the operational modes. For example, option 1104 may be selected by the user to activate the "good night" operational mode. User interface subsystem 104 may detect the user selection and respond by providing instructions to home monitor and control subsystem 102 to instruct elements of home monitor and control subsystem 102 associated with the selected operational mode to operate in accordance with the operational mode.

When the "good night" operational mode is activated, option 1104 may be changed from an option to activate the operational mode to an option to deactivate the operational mode. Accordingly, the user may provide a single input to activate or deactivate the operational mode and thereby control operations of elements of home monitor and control subsystem 102 associated with the operational mode.

User interface subsystem 104 may be configured to provide information about the settings of an operational mode within the context of graphical representation 502 of a floor plan of a home. In certain examples, such information may be provided in response to a user selection of an entry included in list 1102 and associated with a particular operational mode. To illustrate, a user may provide input to select the "off to work I go" entry in list 1102. User interface subsystem 104 may detect the user selection and modify certain graphics 504 that represent elements of home monitor and control subsystem 102 associated with the "off to work I go" operational mode of home monitor and control subsystem 102. In FIG. 11, for example, graphics 504-2, 504-5, and 504-6 have been modified to visually indicate that the elements represented by graphics 504-2, 504-5, and 504-6 are associated with the "off to work I go" operational mode of home monitor and control subsystem 102. In the illustrated example, the borders of graphics 504-2, 504-5, and 504-6 have been thickened and bolded to visually emphasize graphics 504-2, 504-5, and 504-6 as compared to the other graphics 504-1, 504-3, 504-4, and 504-7 displayed in GUI view 1100. Such emphasis may be displayed when the "off to work I go" operational mode is active. Accordingly, the user may readily ascertain from GUI view 1100 that the elements represented by graphics 504-2, 504-5, and 504-6 are associated with the selected "off to work I go" operational mode of home monitor and control subsystem 102.

Additionally or alternatively, graphics 504-2, 504-5, and 504-6 representing elements associated with the selected operational mode of home monitor and control subsystem 102 may provide information that indicates the settings of the elements when operating in accordance with the selected operational mode. For example, graphic 504-2 indicates that the security system represented by graphic 504-2 is "on," graphic 504-5 indicates that the thermostat represented by graphic 504-5 is set to cool to a target temperature of seventy-six degrees Fahrenheit, and graphic 504-6 indicates that the door lock represented by graphic 504-6 is "locked" when operating in accordance with the "off to work I go" operational mode of home monitor and control subsystem 102. Accordingly, the user may readily ascertain from GUI view 1100 the settings of the elements associated with the selected and/or active operational mode when operating in accordance with the operational mode.

User interface subsystem 104 may further provide, together with list 1102 in GUI view 1100, a link 1106 configured to be selected by a user to launch a tool to edit operational modes of home monitor and control subsystem 102. The tool may facilitate management of operational modes of home monitor and control subsystem 102 by the user, including, without limitation, defining new modes, deleting modes, and/or modifying settings of modes of home monitor and control subsystem 102.

Figure 12:
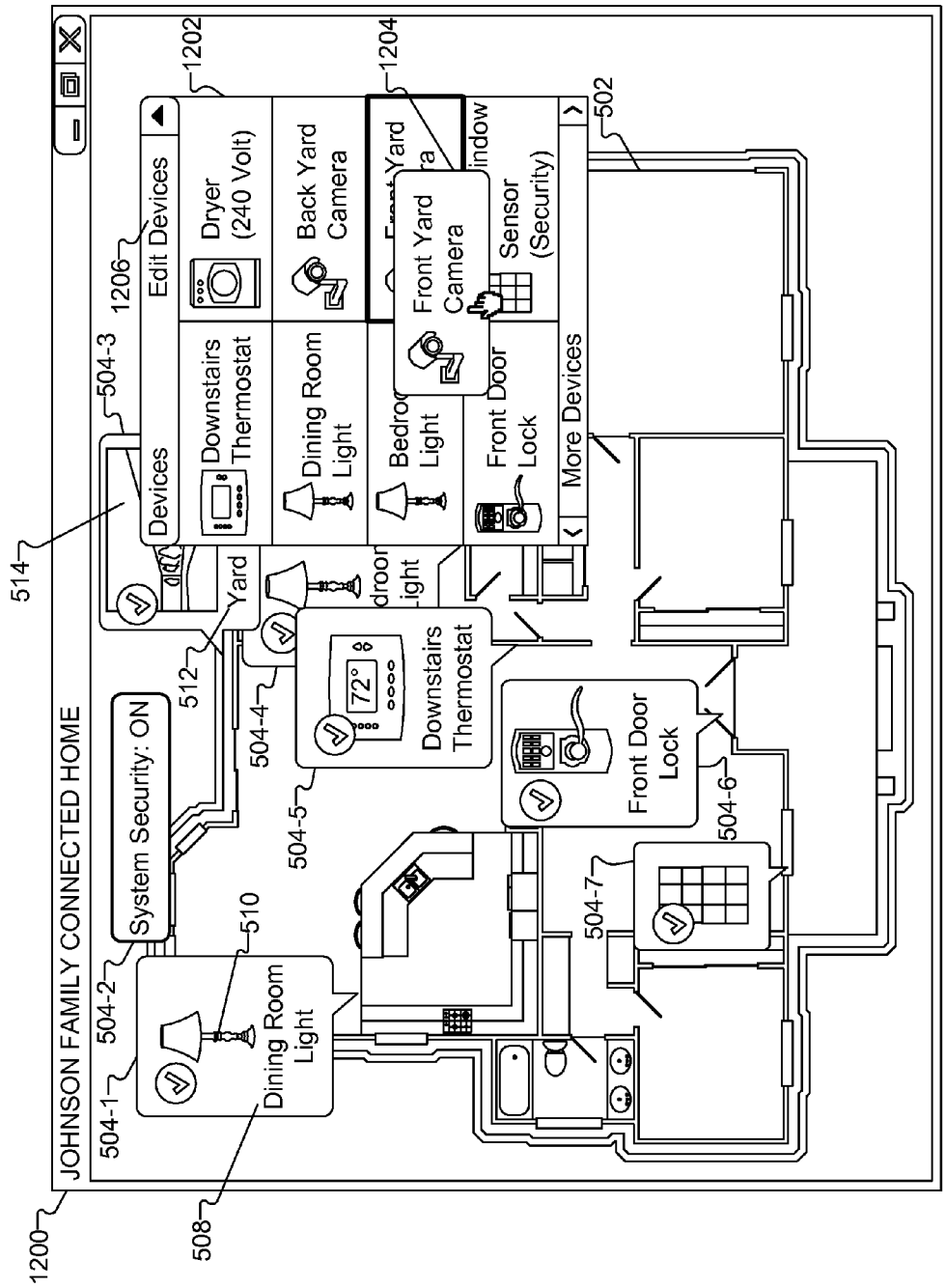

Returning to FIG. 5, GUI view 500 may further include a "devices" option 522 configured to be selected by a user to access information and/or options associated with elements of home monitor and control subsystem 102 located at the user's home. To illustrate, a user may provide input to select the "devices" option 522 shown in FIG. 5. User interface subsystem 104 may detect the selection and respond by providing a populated list of elements included in home monitor and control subsystem 102. To illustrate, FIG. 12 shows a GUI view 1200 that may be displayed in response to a user selection of the "devices" option 522 shown in FIG. 5. As shown, GUI view 1200 may include a populated list 1202 of elements included in home monitor and control subsystem 102. In the illustrated example, list 1202 includes data representative of elements included in home monitor and control subsystem 102, such as a downstairs thermostat, a dining room light fixture, a bedroom light fixture, a front door lock, a dryer, a back yard camera, a front yard camera, and a window sensor.

User interface subsystem 104 may be configured to provide a tool within GUI view 1200 and configured to allow a user to select an element included in list 1202 and to place a graphic 504 representing the selected element relative to the graphical representation 502 of the floor plan of the home in GUI view 1200. For example, the tool may be configured to allow the user to select and drag a graphical object representing the element included in list 1202 from list 1202 and to place the graphical object representing the element onto the graphical representation 502 of the floor plan of the home in GUI view 1200. FIG. 12 illustrates a graphical object 1204 representing the front yard camera being dragged by a user from list 1202 toward graphical representation 502 of the floor plan for placement relative to the floor plan. After placement of graphical object 1204 relative to floor plan, a graphic 504 representing the front yard camera may thereafter be displayed within the context of the floor plan. In this or a similar manner, the user may add a graphic representing an element of home monitor and control subsystem 102 to a GUI view to represent the element of the home monitor and control subsystem 102 within the context of the graphical representation 502 of the floor plan of the home.

User interface subsystem 104 may further provide, together with list 1202 in GUI view 1200, a link 1206 configured to be selected by a user to launch a tool to edit elements of home monitor and control subsystem 102. The tool may facilitate management of elements of home monitor and control subsystem 102 by the user, including, without limitation, adding elements, removing elements, and/or modifying settings of elements of home monitor and control subsystem 102.

As mentioned, in certain examples, user interface subsystem 104 may provide functionality to support end user definition of a floor plan. For example, user interface subsystem 104 may provide a floor plan definition tool for use by a user to define a floor plan (e.g., a floor plan of the user's home) in a user interface provided by user interface subsystem 104 (e.g., within GUI 106). User interface subsystem 104 may use data representative of the defined floor plan to generate graphical representation 502 of the floor plan in GUI 106.

The floor plan definition tool may be provided in any suitable way. As an example, returning to FIG. 5, GUI view 500 may include a link 524 configured to be selected by a user to launch the floor plan definition tool for use by the user to edit the graphical representation 502 of the floor plan of the user's home. The tool may allow the user to modify the floor plan in any suitable way. Similarly, the tool may allow the user to initially define the floor plan in any suitable way.

Figure 13:
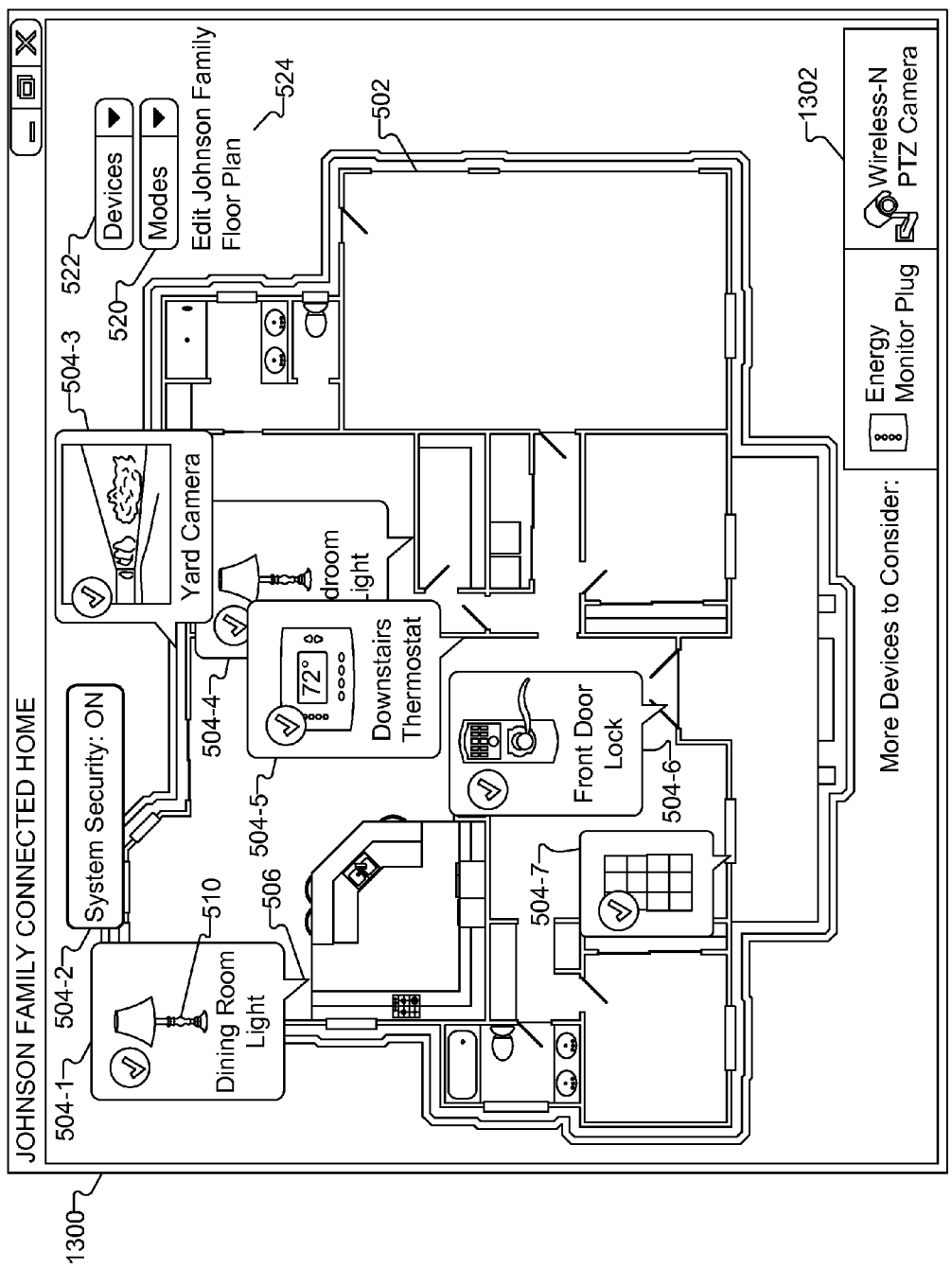

In certain examples, user interface subsystem 104 may be configured to provide recommendations to a user together with the graphical representation 502 of the floor plan of the user's home and graphics 504 positioned relative to the graphical representation 502 of the floor plan of the user's home within a GUI view. For example, user interface subsystem 104 may provide a populated list of recommended elements that are available and suggested to the user for addition to home monitor and control subsystem 102. To illustrate, FIG. 13 shows a GUI view 1300 in which a populated list 1302 of recommended devices is displayed together with graphical representation 502 of the floor plan and graphics 504 in the GUI view 1300. The user may select an entry from the list 1302 to access additional information and/or options related to the device represented by the entry, such as an option to purchase order the device.

Figure 14:
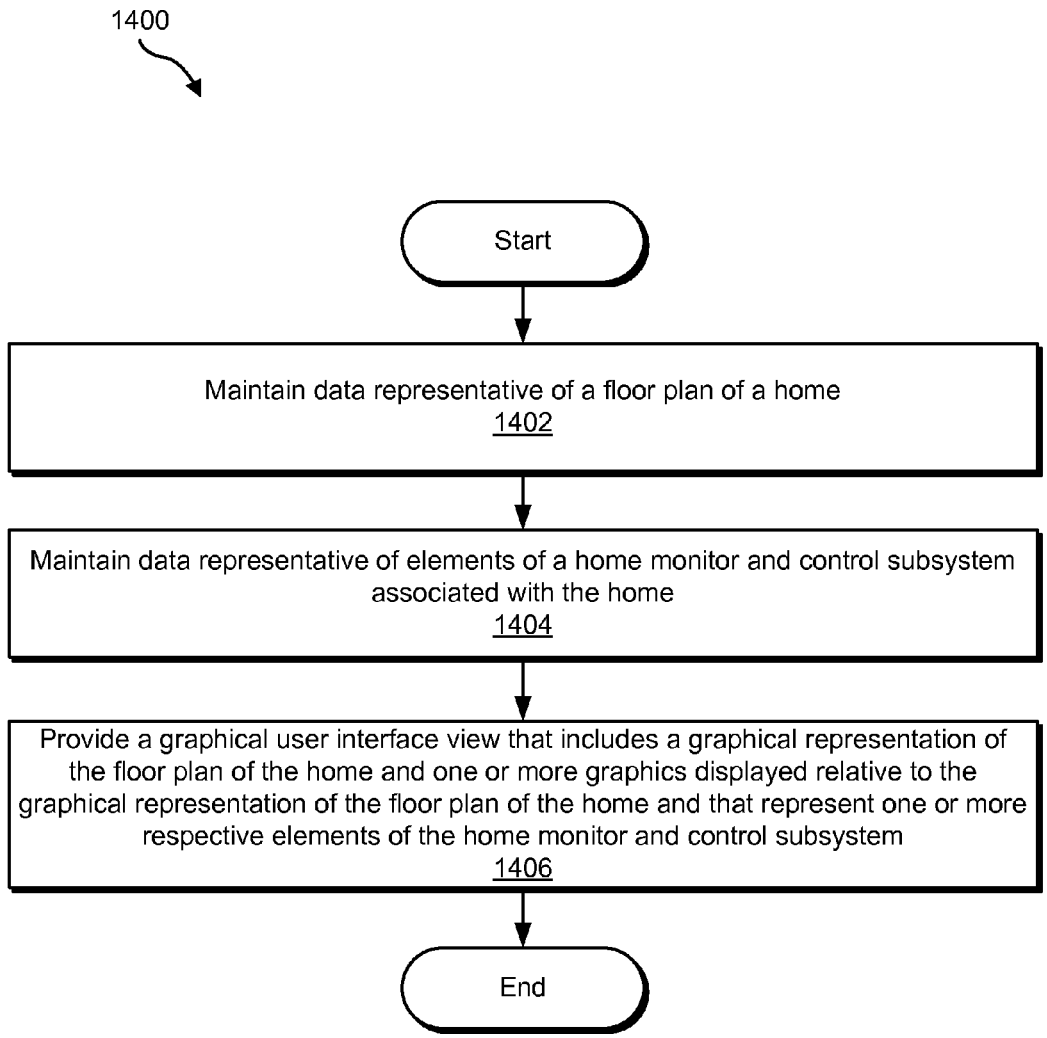
FIGS. 14-15 illustrate exemplary connected home user interface methods according to principles described herein.
Figure 15:
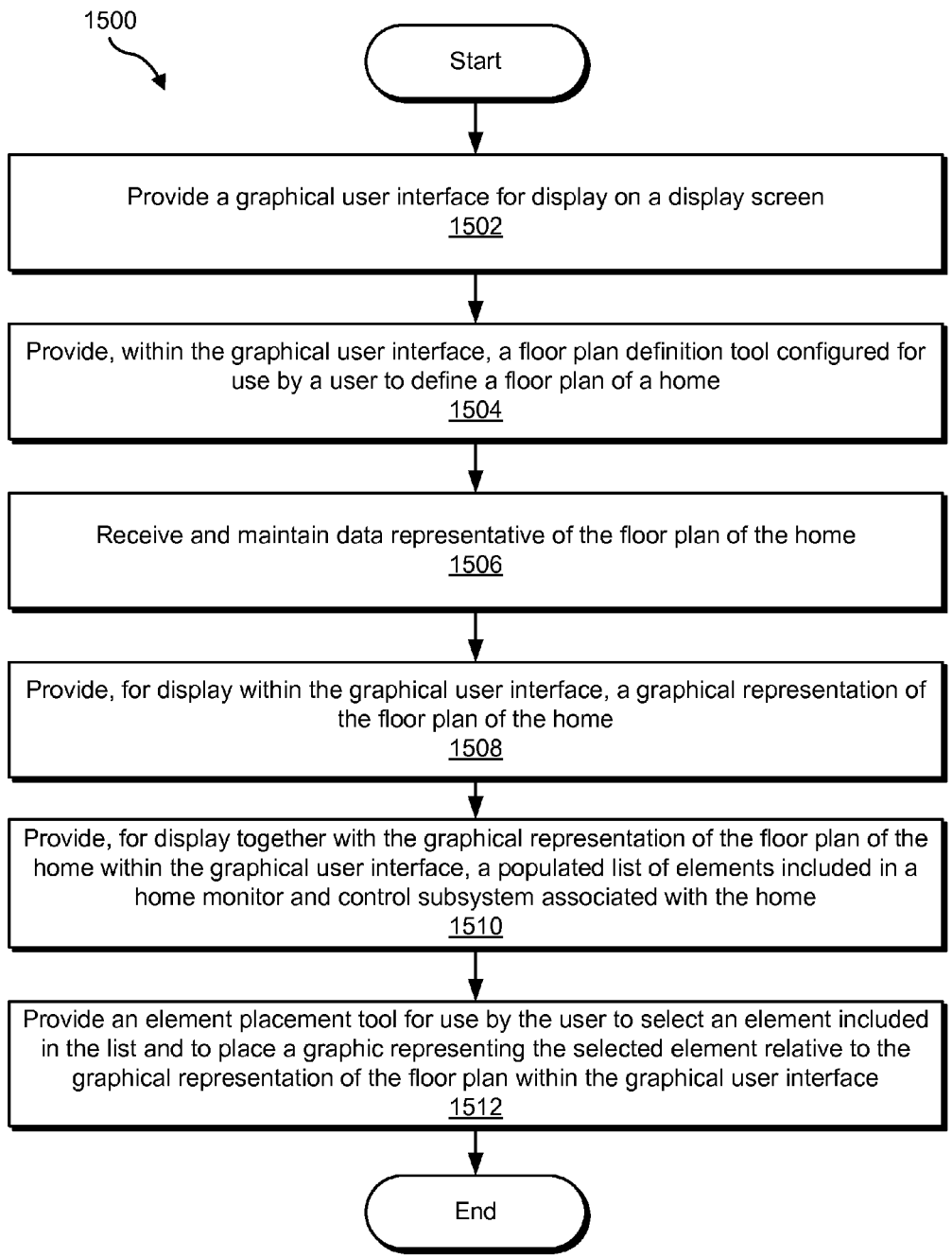

FIGS. 14-15 illustrate exemplary connected home user interface methods 1400 and 1500. While FIGS. 14-15 illustrate exemplary steps according to certain embodiments, other embodiments may omit, add to, reorder, combine, and/or modify any of the steps shown in FIGS. 14-15. One or more of the steps shown in FIG. 14-15 may be performed by user interface subsystem 104 and/or one or more components thereof.

Turning to method 1400 in FIG. 14, in step 1402, user interface subsystem 104 maintains data representative of a floor plan of a home. Step 1402 may be performed in any of the ways described herein. In certain embodiments, for example, user interface subsystem 104 may provide a floor plan definition tool for use by the user to define the floor plan and may receive and store data representative of the defined floor plan.

In step 1404, user interface subsystem 104 maintains data representative of elements of a home monitor and control subsystem associated with the home. Step 1404 may be performed in any of the ways described herein. In certain embodiments, for example, user interface subsystem 104 may communicate with home monitor and control subsystem 102 to request and receive information about the elements of home monitor and control subsystem 102, and may store data representative of the received information.

In step 1406, user interface subsystem 104 provides a GUI view that includes a graphical representation of the floor plan of the home and one or more graphics displayed relative to the graphical representation of the floor plan of the home and that represent one or more respective elements of the home monitor and control subsystem. Step 1406 may be performed in any of the ways described herein. In certain embodiments, for example, user interface subsystem 104 may use the data maintained by user interface subsystem 104 in steps 1402 and 1404 to generate the GUI view, which may include any of the exemplary GUI views described herein.

Turning to method 1500 in FIG. 15, in step 1502, user interface subsystem 104 provides a GUI for display on a display screen. Step 1502 may be performed in any of the ways described herein.

In step 1504, user interface subsystem 104 provides, within the GUI, a floor plan definition tool configured for use by a user to define a floor plan of a home. Step 1504 may be performed in any of the ways described herein.

In step 1506, user interface subsystem 104 receives and maintains data representative of the floor plan of the home. Step 1506 may be performed in any of the ways described herein.

In step 1508, user interface subsystem 104 provides, for display within the GUI, a graphical representation of the floor plan of the home. Step 1508 may be performed in any of the ways described herein. For example, user interface subsystem 104 may provide a GUI view that includes the graphical representation of the floor plan displayed therein.

In step 1510, user interface subsystem 104 provides, for display together with the graphical representation of the floor plan of the home within the GUI, a populated list of elements included in a home monitor and control subsystem associated with the home. Step 1510 may be performed in any of the ways described herein. For example, user interface subsystem 104 may provide a GUI view such as GUI view shown in FIG. 12 for display.

In step 1512, user interface subsystem 104 provides an element placement tool for use by the user to select an element included in the list and to place a graphic representing the selected element relative to the graphical representation of the floor plan within the graphical user interface. Step 1512 may be performed in any of the ways described herein. For example, the element placement tool may allow the user to drag and drop a graphical object representing an element onto the graphical representation of the floor plan within the graphical user interface, such as described above in relation to FIG. 12.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 16:
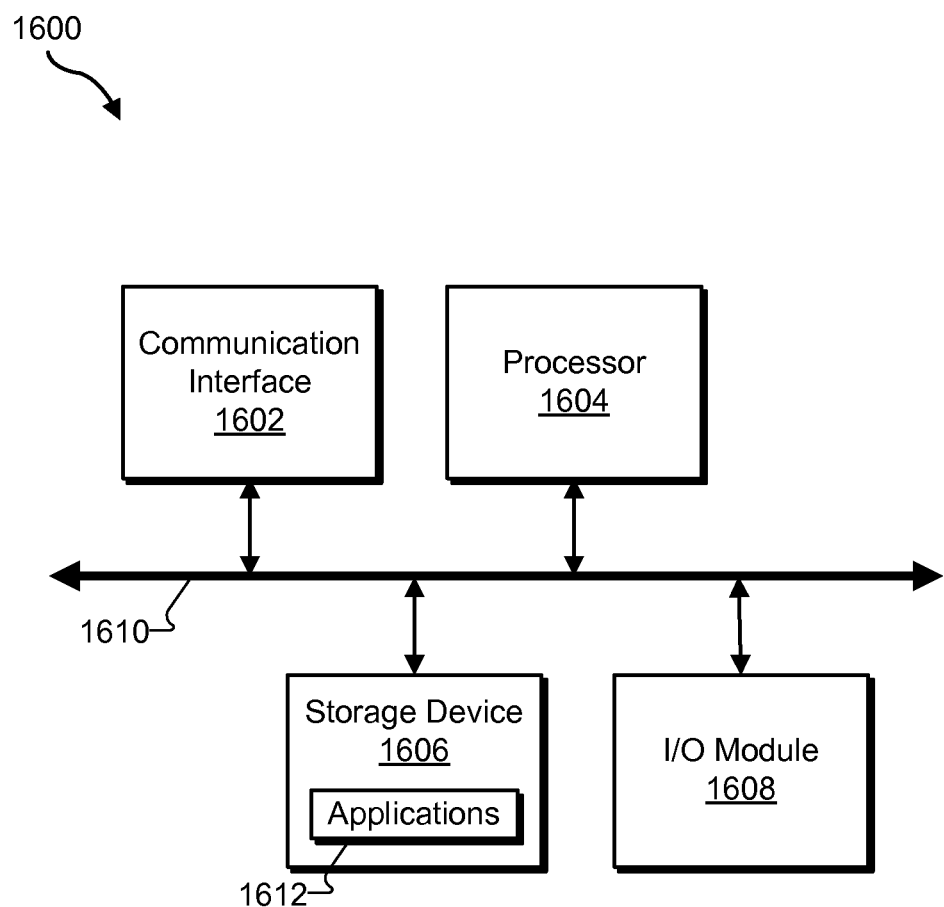
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit capable of processing data or interpreting, executing, and/or directing execution of one or more of the instructions, processes, and/or operations described herein. Processor 1604 may execute and/or direct execution of operations as directed by one or more applications 1612 (which may include one or more software applications 102 included in suite 100) or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the systems and/or system components described herein may be implemented by or within one or more components of computing device 1600. For example, one or more applications 1612 residing within storage device 1606 may be configured to direct processor 1604 to perform one or more processes or functions associated with user interface subsystem 104 or one or more components thereof (e.g., communication facility 402, authentication facility 404, floor plan management facility 406, element management facility 408, and/or user interface facility 410). Likewise, storage facility 412 may be implemented by or within storage device 1606.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. As another example, while certain examples described herein are directed to a floor plan of a home, other examples may be directed to floor plans of any other structural premises such as a business premises. The description and drawings are accordingly to be regarded in an illustrative rather than a restrictive sense.

What is claimed is:

1. A method comprising:
   providing, by a user interface subsystem communicatively coupled to a home monitor and control subsystem, a graphical user interface view for display on a display screen;
   providing, by the user interface subsystem within the graphical user interface view, a graphical representation of a floor plan of a home associated with the home monitor and control subsystem;
   providing, by the user interface subsystem within the graphical user interface view, a plurality of graphics representing a plurality of elements of the home monitor and control subsystem, wherein the plurality of graphics are positioned relative to the graphical representation of the floor plan in the graphical user interface view to visually indicate a location of each of the plurality of elements at the home;
   providing, by the user interface subsystem, a populated list of operational modes of the home monitor and control subsystem, each operational mode included in the populated list of operational modes defining a predefined mode of operation in which at least some of the plurality of elements of the home monitor and control subsystem operate in accordance with predefined settings;
   detecting, by the user interface subsystem, a user selection of an operational mode included in the list of populated operational modes;
   determining, by the user interface subsystem, that a first element included in the plurality of elements and a second element included in the plurality of elements are included in the selected operational mode, the first element represented by a first graphic included in the plurality of graphics and the second element represented by a second graphic included in the plurality of graphics, the first graphic including both a first operational mode indicator and a first operational status indicator that indicates a current operational status of the first element, the second graphic including both a second operational mode indicator and a second operational status indicator that indicates a current operational status of the second element; and
   modifying, by the user interface subsystem in response to the detecting of the user selection of the operational mode included in the list of populated operational modes, the first operational mode indicator and the second operational mode indicator to have a same indicator in the first graphic as in the second graphic and that visually indicates as compared to a remainder of graphics included in the plurality of graphics, that the first element and the second element represented respectively by the first graphic and the second graphic are included in the selected operational mode.

2. The method of claim 1, wherein the first graphic comprises a callout window overlaid on the graphical representation of the floor plan of the home.

3. The method of claim 2, wherein the first graphic further comprises a textual description of the first element within the callout window.

4. The method of claim 1, wherein the first graphic indicates a current connection status of the first element.

5. The method of claim 1, wherein:
   the first element comprises a video camera; and
   the first graphic comprises a display of a video feed captured by the video camera.

6. The method of claim 1, wherein the first graphic comprises at least one option that is selectable by a user to remotely control operation of the first element.

7. The method of claim 1, wherein the first graphic comprises a user selectable link to settings information for the first element.

8. The method of claim 1, wherein the first graphic comprises a user selectable link to historical notification information for the first element.

9. The method of claim 1, wherein the first graphic comprises a user selectable link to video recording information for the first element.

10. The method of claim 1, further comprising:
    providing, by the user interface subsystem within the graphical user interface view, a populated list of the plurality of elements included in the home monitor and control subsystem; and
    providing, by the user interface subsystem, an element placement tool that allows a user to select an element included in the list of the plurality of elements and to place a graphic representing the selected element relative to the graphical representation of the floor plan.

11. The method of claim 10, wherein the element placement tool allows the user to drag a graphical object representing the element included in the list of the plurality of elements from the list of the plurality of elements and to place the graphical object representing the element onto the graphical representation of the floor plan.

12. The method of claim 1, further comprising providing, by the user interface subsystem within the graphical user interface view, a populated list of one or more additional elements available to be added to the home monitor and control subsystem.

13. The method of claim 1, further comprising providing, by the user interface subsystem, a floor plan definition tool that allows a user to define the graphical representation of the floor plan.

14. The method of claim 1, embodied as computer-executable instructions on at least one non-transitory computer-readable medium.

15. A method comprising:
providing, by a user interface subsystem communicatively coupled to a home monitor and control subsystem, a graphical user interface for display on a display screen;
providing, by the user interface subsystem within the graphical user interface, a floor plan definition tool configured for use by a user to define a floor plan of a home;
receiving and maintaining, by the user interface subsystem, data representative of the floor plan of the home;
providing, by the user interface subsystem for display within the graphical user interface, a graphical representation of the floor plan of the home;
providing, by the user interface subsystem for display together with the graphical representation of the floor plan of the home within the graphical user interface, a populated list of a plurality of elements included in the home monitor and control subsystem;
providing, by the user interface subsystem, an element placement tool for use by the user to select an element included in the list of the plurality of elements and to place a graphic representing the selected element relative to the graphical representation of the floor plan within the graphical user interface such that a position of the graphic relative to the graphical representation of the floor plan visually indicates a location of the element at the home;
positioning, by the user interface subsystem in response to the user utilizing the element placement tool, a plurality of graphics representing a plurality of selected elements within the graphical user interface;
providing, by the user interface subsystem within the graphical user interface, a populated list of operational modes of the home monitor and control subsystem, each operational mode included in the populated list of operational modes defining a predefined mode of operation in which at least some of the plurality of selected elements of the home monitor and control subsystem operate in accordance with predefined settings;
detecting, by the user interface subsystem, a user selection of an operational mode included in the list of populated operational modes;
determining, by the user interface subsystem, that a first element included in the plurality of selected elements and a second element included in the plurality of selected elements are included in the selected operational mode, the first element represented by a first graphic included in the plurality of graphics and the second element represented by a second graphic included in the plurality of graphics, the first graphic including both a first operational mode indicator and a first operational status indicator that indicates a current operational status of the first element, the second graphic including both a second operational mode indicator and a second operational status indicator that indicates a current operational status of the second element; and
modifying, by the user interface subsystem in response to the detecting of the user selection of the operational mode included in the list of populated operational modes, the first operational mode indicator and the second operational mode indicator to have a same indicator in the first graphic as in the second graphic and that visually indicates visually indicate, as compared to a remainder of graphics included in the plurality of graphics, that the first element and the second element represented respectively by the first graphic and the second graphic are included in the selected operational mode.

16. The method of claim 15, wherein the element placement tool allows the user to drag a graphical object representing the selected element from the list of the plurality of elements and to place the graphical object representing the selected element onto the graphical representation of the floor plan.

17. The method of claim 15, embodied as computer-executable instructions on at least one non-transitory computer-readable medium.

18. A system comprising:
a user interface subsystem comprising at least one processor and communicatively coupled to a home monitor and control subsystem;
wherein the user interface subsystem
provides a graphical user interface view for display on a display screen, the graphical user interface view including:
a graphical representation of a floor plan of a home associated with the home monitor and control subsystem,
a plurality of graphics representing a plurality of elements of the home monitor and control subsystem, wherein the plurality of graphics are positioned relative to the graphical representation of the floor plan in the graphical user interface view to visually indicate a location of each of the plurality of elements at the home, and
a populated list of operational modes of the home monitor and control subsystem, each operational mode included in the populated list of operational modes defining a predefined mode of operation in which at least some of the plurality of elements of the home monitor and control subsystem operate in accordance with predefined settings;
detects a user selection of an operational mode included in the list of populated operational modes;
determines that a first element included in the plurality of elements and a second element included in the plurality of elements are included in the selected operational mode, the first element represented by a first graphic included in the plurality of graphics and the second element represented by a second graphic included in the plurality of graphics, the first graphic including both a first operational mode indicator and a first operational status indicator that indicates a current operational status of the first element, the second graphic including both a second operational mode indicator and a second operational status indicator that indicates a current operational status of the second element; and
modifies, in response to the detection of the user selection of the operational mode included in the list of populated operational modes, the first operational mode indicator and the second operational mode indicator to have a same indicator in the first graphic as in the second graphic and that visually indicates, as compared to a remainder of graphics included in the plurality of graphics, that the first element and the second element represented respectively by the first graphic and the second graphic are included in the selected operational mode.

19. The method of claim 1, wherein the same indicator, which is included in the first graphic and the second graphic based on the modifying, is not element specific.

\* \* \* \* \*